(12) United States Patent
Zagrodnik et al.

(10) Patent No.: US 12,166,222 B2
(45) Date of Patent: Dec. 10, 2024

(54) BATTERY PACK CORE FOR FIRE AND EXPLOSION PROTECTION FOR BATTERY MODULE

(71) Applicants: Rolls-Royce Corporation, Indianapolis, IN (US); Rolls-Royce plc, London (GB); Rolls-Royce Singapore Pte. Ltd., Singapore (SG)

(72) Inventors: Michael Adam Zagrodnik, Singapore (SG); Stephen Mountain, Ingleby (GB); Peter Schenk, Greenwood, IN (US); Mathivanan Anand Prabhu, Singapore (SG); Krishnamoorthi Sivalingam, Singapore (SG); Teh Yee Siang, Singapore (SG); Chandana Jayampathi Gajanayake, Singapore (SG); Melvin Yang Yueng Yap, Singapore (SG)

(73) Assignees: Rolls-Royce Corporation, Indianapolis, IN (US); Rolls-Royce plc, London (GB); Rolls-Royce Singapore Pte. Ltd., Singapore (SG)

( * ) Notice: Subject to any disclaimer, the term of this patent is extended or adjusted under 35 U.S.C. 154(b) by 171 days.

(21) Appl. No.: 17/227,027

(22) Filed: Apr. 9, 2021

(65) Prior Publication Data
US 2022/0328916 A1 Oct. 13, 2022

(51) Int. Cl.
*H01M 50/204* (2021.01)
*H01M 10/613* (2014.01)
(Continued)

(52) U.S. Cl.
CPC ....... *H01M 50/204* (2021.01); *H01M 10/613* (2015.04); *H01M 10/625* (2015.04);
(Continued)

(58) Field of Classification Search
CPC .......... H01M 10/643; H01M 10/6568; H01M 10/613; H01M 10/625; H01M 10/6556;
(Continued)

(56) References Cited

U.S. PATENT DOCUMENTS

| 3,864,170 A | 2/1975 | Krieger |
| 9,059,435 B2 | 6/2015 | Scott et al. |

(Continued)

FOREIGN PATENT DOCUMENTS

| WO | WO-2019125284 A1 * | 6/2019 | ............. B60L 58/26 |
| WO | WO-2021028187 A1 * | 2/2021 | ............. H01G 11/18 |

OTHER PUBLICATIONS

Kermani et al., "Elliptical Lithium—Ion Batteries: Transverse and Axial Loadings Under Wet/Dry Conditions," Energy Science and Engineering, vol. 7, Feb. 12, 2019, pp. 890-898.

(Continued)

*Primary Examiner* — Eugenia Wang
(74) *Attorney, Agent, or Firm* — Shumaker & Sieffert, P.A.

(57) ABSTRACT

A battery pack core may include a cold plate comprising a plurality of apertures defined between a first major surface and a second major surface of the cold plate; a plurality of battery cells, a single battery cell positioned in each aperture of the plurality of apertures such that a first end of the battery cell projects beyond the first major surface and a second end of the battery cell projects beyond the second major surface; and a plurality of silicone bushings, a silicone bushing surrounding each battery cell of the plurality of battery cells and contacting a wall of the aperture in which the battery cell is positioned.

16 Claims, 11 Drawing Sheets

(51) Int. Cl.
  *H01M 10/625* (2014.01)
  *H01M 10/6556* (2014.01)
  *H01M 10/6568* (2014.01)
  *H01M 50/249* (2021.01)

(52) U.S. Cl.
  CPC ... *H01M 10/6556* (2015.04); *H01M 10/6568* (2015.04); *H01M 50/249* (2021.01); *H01M 2220/20* (2013.01)

(58) Field of Classification Search
  CPC ............ H01M 50/204; H01M 50/249; H01M 50/244; H01M 50/293; H01M 2220/20
  See application file for complete search history.

(56) References Cited

U.S. PATENT DOCUMENTS

| | | | |
|---|---|---|---|
| 9,815,563 B2 | 11/2017 | Yates et al. | |
| 10,598,440 B2 | 3/2020 | Hisanaga et al. | |
| 2004/0023108 A1 | 2/2004 | Nakanishi et al. | |
| 2004/0131932 A1 | 7/2004 | Hamada et al. | |
| 2007/0243462 A1 | 10/2007 | Nagatani et al. | |
| 2010/0285346 A1* | 11/2010 | Graban ............. | H01M 10/6567 429/120 |
| 2012/0094160 A1 | 4/2012 | Lee et al. | |
| 2012/0141851 A1 | 6/2012 | Hou et al. | |
| 2013/0196214 A1 | 8/2013 | Scott et al. | |
| 2015/0287999 A1 | 10/2015 | Guen | |
| 2016/0125107 A1 | 5/2016 | Druckman et al. | |
| 2016/0172727 A1* | 6/2016 | Chan .................. | H01M 10/613 429/120 |
| 2018/0017332 A1 | 1/2018 | Hisanaga et al. | |
| 2018/0069277 A1* | 3/2018 | Mastrandrea ....... | H01M 50/507 |
| 2018/0069777 A1 | 3/2018 | Branson et al. | |
| 2018/0086472 A1 | 3/2018 | Gore | |
| 2018/0212222 A1 | 7/2018 | Barton et al. | |
| 2019/0067655 A1* | 2/2019 | Nakamura .......... | H01M 50/502 |
| 2019/0273295 A1* | 9/2019 | Chan .................. | H01M 10/613 |
| 2020/0212377 A1 | 7/2020 | Nakamura | |
| 2020/0220125 A1 | 7/2020 | Caliskan et al. | |
| 2021/0043884 A1 | 2/2021 | Sarpotdar | |
| 2021/0143492 A1 | 5/2021 | Zagrodnik | |
| 2021/0376405 A1 | 12/2021 | Browning et al. | |
| 2022/0077520 A1* | 3/2022 | Donovan ............. | H01M 50/20 |
| 2022/0416326 A1* | 12/2022 | Kritzer ................ | H01M 50/213 |
| 2023/0019325 A1 | 1/2023 | Haiss et al. | |

OTHER PUBLICATIONS

Chu et al., "The Design and Investigation of a Cooling System for a High Power Ni-MH Battery Pack in Hybrid Electric Vehicles," Applied Sciences, vol. 10, Mar. 1, 2020, 22 pp.
U.S. Appl. No. 17/226,954, filed Apr. 9, 2021, by Zagrodnik et al.
U.S. Appl. No. 17/226,863, filed Apr. 9, 2021, by Zagrodnik et al.
Office Action from U.S. Appl. No. 17/226,863 dated Mar. 28, 2023, 20 pp.
Office Action from U.S. Appl. No. 17/226,954 dated Mar. 30, 2023, 12 pp.
Patel, "Identifying and Reducing Stresses in Pressure Vessels", DesignNews, Jun. 2015, 6 pp.
Price et al., "Residual Stresses Evaluation in Welds and Implications for Design for Pressure Vessel Applications", Journal of Pressure Vessel Technology, vol. 128, No. 4, Jul. 2005, 8 pp.
PTI Thermal Solutions, "Ceramic Fibers and Felts", 2018, 5 pp., (Applicant points out, in accordance with MPEP 609.04(a), that the year of publication, 2018, is sufficiently earlier than the effective U.S. filing date, so that the particular month of publication is not an issue.).
Response to Office Action dated Mar. 28, 2023 from U.S. Appl. No. 17/226,863, filed Jun. 28, 2023, 9 pp.
Response to Office Action dated Mar. 30, 2023 from U.S. Appl. No. 17/226,954, filed Jun. 30, 2023, 7 pp.
Advisory Action from U.S. Appl. No. 17/226,863 dated Nov. 6, 2023, 6 pp.
Response to Final Office Action dated Aug. 14, 2023 from U.S. Appl. No. 17/226,863, filed Oct. 13, 2023, 9 pp.
Final Office Action from U.S. Appl. No. 17/226,863 dated Aug. 14, 2023, 24 pp.
Final Office Action from U.S. Appl. No. 17/226,954 dated Dec. 20, 2023, 17 pp.
Response to Final Office Action dated Dec. 20, 2023 from U.S. Appl. No. 17/226,954, filed Mar. 20, 2024, 9 pp.
Office Action from U.S. Appl. No. 17/226,954 dated Jun. 10, 2024, 18 pp.
Response to Office Action dated Apr. 16, 2024 from U.S. Appl. No. 17/226,863, filed Jul. 16, 2024, 9 pp.
Final Office Action from U.S. Appl. No. 17/226,863 dated Sep. 4, 2024, 23 pp.
Response to Office Action dated Jun. 10, 2024 from U.S. Appl. No. 17/226,954, filed Sep. 5, 2024, 8 pp.

* cited by examiner

BATTERY PACK CORE FOR FIRE AND EXPLOSION PROTECTION FOR BATTERY MODULE

TECHNICAL FIELD

This disclosure relates to a battery pack core for an aerospace battery.

BACKGROUND

Aerospace batteries may store electrical energy for electrical system use, including instrumentation and control, in-cabin services, and/or propulsion systems. Electrical energy storage needs are increasing as airplanes provide additional in-cabin entertainment, transition from hydraulic to electrical control systems, transition to hybrid or electrical propulsion systems, or a combination thereof.

SUMMARY

In some examples, the disclosure describes a battery housing for an aerospace battery. The battery housing may include a first endplate; a flange; and an elliptical cylinder extending from a first cylinder end to a second cylinder end. The first cylinder end of the elliptical cylinder may be welded to the first endplate, and the second cylinder end of the elliptical cylinder may be welded to the flange. The elliptical cylinder is formed from a sheet of material comprising a first sheet end and a second sheet end. The first sheet end may be welded to the second sheet end at a weld location that runs from the first cylinder end to the second cylinder end at a perimeter location that is calculated to experience a reduced stress during pressurization of the housing.

In some examples, the disclosure describes a method for forming a housing of an aerospace battery. The method may include welding at least one sheet of material to form a cylindrical shape; inserting a first end of the cylindrical shape into a first groove formed in a first endplate, wherein the first groove defines a first ellipse; welding the first end of the cylindrical shape to the first endplate; inserting a second end of the cylindrical shape into a second groove formed in a flange, wherein the second groove defines a second ellipse; and welding the second end of the cylindrical shape to the first endplate.

In some examples, the disclosure describes a battery pack core including a cold plate comprising a plurality of apertures defined between a first major surface and a second major surface of the cold plate; a plurality of battery cells, a single battery cell positioned in each aperture of the plurality of apertures such that a first end of the battery cell projects beyond the first major surface and a second end of the battery cell projects beyond the second major surface; and a plurality of silicone bushings, a silicone bushing surrounding each battery cell of the plurality of battery cells and contacting a wall of the aperture in which the battery cell is positioned.

In some examples, the disclosure describes a method that includes assembling a plurality of battery cells, a plurality of silicone bushings, and a cold plate so that a single silicone bushing surrounds a corresponding circumference of each battery cell and a single silicone bushing is in each aperture of a plurality of apertures of the cold plate, wherein a first end of each battery cell projects beyond a first major surface of the cold plate and a second end of each battery cell projects beyond a second major surface of the cold plate, wherein each silicone bushing contacts a wall of the aperture in which the corresponding battery cell is positioned to hold the battery cell in place within the aperture.

In some examples, the disclosure describes an aerospace battery including a housing; a battery pack core; a ceramic felt surrounding at least part of the battery pack core; and a closed cell foam filling open space between the battery pack core, the ceramic felt, and the housing.

In some examples, the disclosure describes a method that includes inserting a form within a housing of an aerospace battery, wherein the form corresponds to a shape of a battery pack core to be housed within the housing; reactive molding a closed cell foam within the housing around the form, wherein the closed cell foam fills substantially all the space between the housing and the form; removing the form to define a cavity in the closed cell foam; and inserting a battery pack core in the cavity.

The details of one or more examples are set forth in the accompanying drawings and the description below. Other features, objects, and advantages will be apparent from the description and drawings, and from the claims.

DETAILED DESCRIPTION

Batteries, such as lithium ion batteries, often include multiple battery cells electrically connected together (e.g., in series and/or parallel) and housed in a single housing. The battery cells are connected so that the battery outputs electrical power at a selected voltage and the battery module can provide a selected power level. Each battery cell includes an anode, a cathode, an electrolyte, and components housed in a battery cell housing. Some of the components of the battery cell may be flammable or combustible. During operation, should a spark or short circuit occur in one of the battery cells, one or more components of the battery cell may burn, and the fire may spread to other battery cells. Should the thermal event burn in an uncontrolled matter, the fire may escape the battery housing and/or the battery may explode.

In accordance with techniques of this invention, a battery for aerospace applications may include one or more features configured to reduce or substantially eliminate risk of uncontrolled fires and/or explosion. For example, the battery housing, fill material in the interior of the battery housing, and/or the battery pack core may include one or more features that reduce or substantially eliminate risk of uncontrolled fires and/or explosion.

Figure 1:
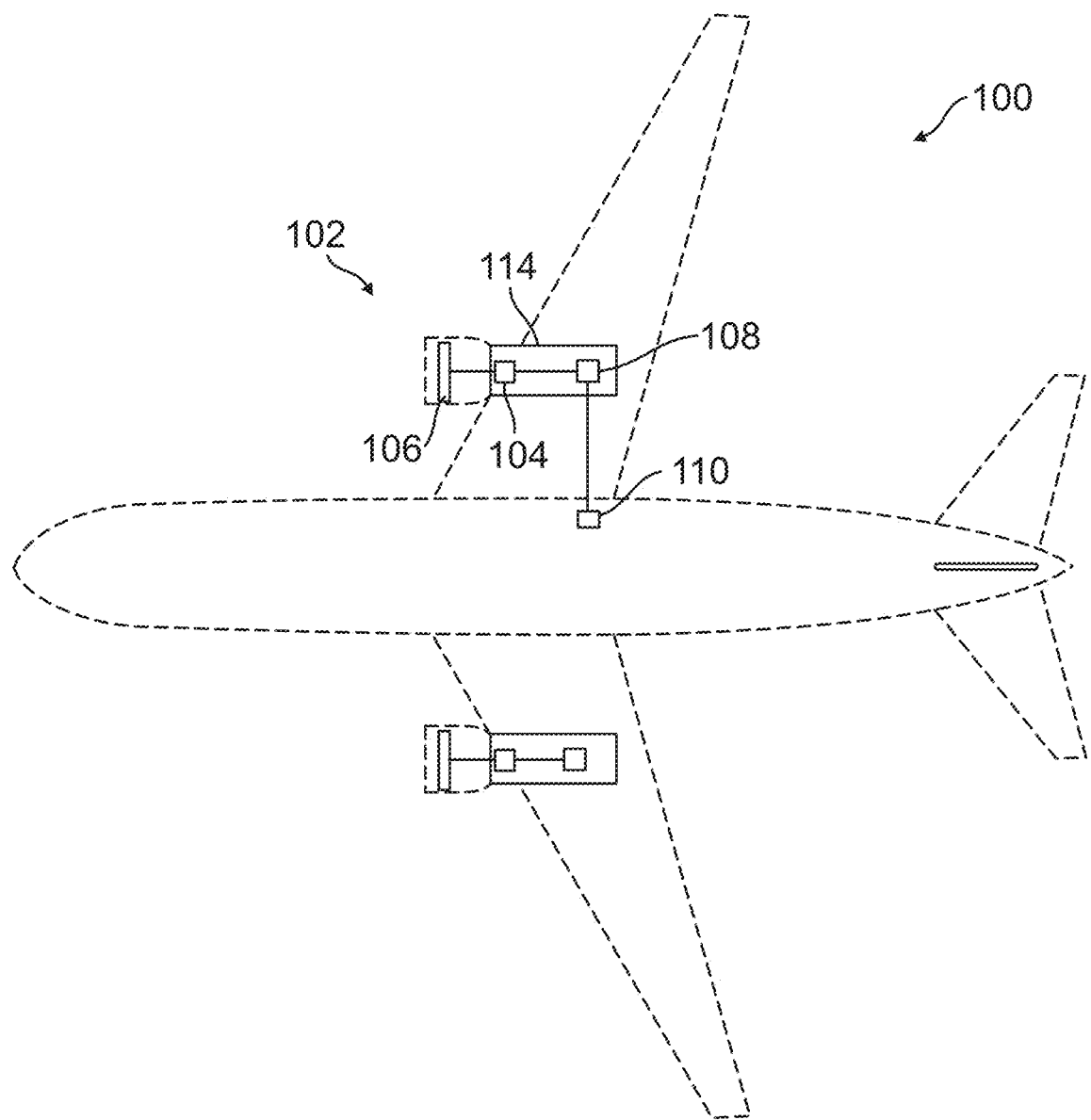
FIG. 1 is a conceptual diagram of a vehicle that includes an aerospace battery, in accordance with one or more techniques of this disclosure.

FIG. 1 is a conceptual diagram of a vehicle 100 that includes an aerospace battery, in accordance with one or more techniques of this disclosure. In some examples, vehicle 100 is an aircraft. In other examples, vehicle 100 may include any type of aerospace vehicle utilizing a battery, including a fixed wing aircraft, a rotary wing aircraft, or the like. Vehicle 100 may be manned, semiautonomous, or autonomous.

As shown in the example of FIG. 1, vehicle 100 may include propulsion system 102. In some examples, propulsion system 102 may include a combustion engine, such as a gas-turbine engine 104. Propulsion system 102 includes gas turbine engine 104 configured to drive a propulsor 106. Propulsion system 102 also include electric generator 108 that may both start the gas-turbine engine and generate electrical power using mechanical energy generated by the gas-turbine engine. As shown in FIG. 1, propulsion system 102 may include generator 108 that generates electrical energy from mechanical energy of gas turbine engine 104 and may transfer the energy to battery 110.

Battery 110 may be connected to an electrical system and provide electrical power for any one of a variety of functions of vehicle 100. For example, battery 110 may be connected to an electrical bus and provide power for in-cabin functions, such as in-cabin entertainment, lighting, and the like. As another example, battery 110 may be connected to an electrical bus and provide power for cockpit electronics. As a further example, battery 110 may be connected to an electrical bus and provide power for starting gas turbine engine 104, powering propulsor 106, or the like.

In accordance with aspects of this disclosure, battery 110 may include one or more features configured to reduce or substantially eliminate risk of uncontrolled fires and/or explosion. For example, battery 110 may include a battery housing, a fill material in the interior of the battery housing, and/or the battery pack core that include one or more features that reduce or substantially eliminate risk of uncontrolled fires and/or explosion.

In some examples, battery 110 may include a battery housing may include a shape and construction configured to increase pressure capability of the battery housing, such that the battery housing is more capable of withstanding high internal pressures, such as those that may occur during uncontrolled fires and/or explosions within the battery housing. For instance, the battery housing may include a first endplate, a flange, and an elliptical cylinder. The first endplate and the flange may define ends of the battery housing, and the elliptical cylinder extends between the first endplate and the flange. An elliptical cylinder may provide higher pressure capability than a hollow rectangle of similar volume and wall thickness. An elliptical cylinder also may enclose a battery pack core that is generally a rectangular solid with less free space between the battery pack core and the elliptical cylinder than a (circular) cylinder enclosing the same battery pack core. In this way, an elliptical cylinder may provide a balance between pressure capability and enclosed volume.

In some examples, the elliptical cylinder may be formed from a sheet of metal by welding together two opposite ends of the sheet. The location of the weld along the circumference of the elliptical cylinder may be selected based on predicted stress experienced by the elliptical cylinder when the interior of the battery housing is pressurized. In some examples, the weld location may be parallel to a longitudinal axis of the elliptical cylinder and located at a perimeter position that experiences a relatively low stress when the interior of the battery housing is pressurized. In some examples, the weld location may be parallel to a longitudinal axis of the elliptical cylinder and located at a perimeter position that experiences substantially a lowest average pressure along the length of the weld. This may increase pressure resistance of the housing as a whole, since the weld may have the lowest yield stress of the elliptical cylinder.

In some examples, battery 110 may include one or more fill materials that at least partially fill otherwise empty space within the battery housing. For example, the one or more fill materials may at least partially fill space between an inner wall of the battery housing and surfaces of the battery pack core. The fill materials may be include a ceramic felt, a closed cell foam, or both. Both the closed cell foam and the ceramic felt may include substantially non-combustible materials. For example, the closed cell foam may include polymer, such as a polyurethane. In some implementations, the polyurethane foam may be mixed or filled with a fire retardant. The ceramic felt may include, for example, an alumina-silicate, a calcium-magnesium oxide, or the like. By filling otherwise empty space within the battery housing, the amount of free air in the enclosure may be reduced, which may reduce a rate at which components within the battery housing burn if ignited and reduce or substantially eliminate a risk of explosion.

In some examples, battery 110 may include a battery pack core may be configured to reduce or substantially eliminate a risk of thermal runaway from one battery cell resulting in other battery cells also igniting. For example, the battery pack core may include a cold plate that includes a plurality of apertures defined between a first major surface and a second major surface of the cold plate. The battery pack core also may include a plurality of battery cells. A single battery cell is positioned in each aperture of the plurality of apertures such that a first end of the battery cell projects beyond the first major surface and a second end of the battery cell projects beyond the second major surface. The battery pack core further includes a plurality of silicone bushings. A silicone bushing surrounds each battery cell of the plurality of battery cells and is configured to contact a wall of the aperture in which the battery cell is positioned. The silicone bushing may remain elastic at a wide range of temperatures, which may reduce vibration transferring to the battery cells. Further, the silicone bushing may have relatively high thermal conductivity, which provides effective heat transfer from the thermal cells to the cold plate.

The cold plate also may include features that help isolate heat within regions of the cold plate. For example, the cold plate may include at least one liquid cooling channel comprising a plurality of parallel channel sections. The plurality of battery cells may be arranged in a plurality of rows, and a parallel channel section of the plurality of parallel channel sections may be positioned between every other row of battery cells such that two rows of battery cells are positioned between adjacent parallel channel sections of the serpentine liquid cooling channel. This ensures that each battery cell is directly adjacent to a liquid cooling channel.

In some examples, the cold plate also may define a plurality of thermal break apertures extending from the first major surface of the cold plate to the second major surface of the cold plate. The plurality of thermal break apertures separate groups of the plurality of battery cells. For example, each thermal break aperture may extend from near one liquid cooling channel to near another liquid cooling channel. By including both at least one liquid cooling channel and thermal break apertures, the cold plate may thermally separate groups of battery cells from each other, which may reduce heat transfer from one group of battery cells to another, and reduce a risk of thermal runaway events or fires spreading from one group of battery cells to another.

By including one or more of the features described herein, battery 110 may include may be more resilient to thermal events, such as fires or explosions.

In some implementations, the cold plate also may be a structural member of battery 110. For instance, the cold plate may contribute mechanical strength to provide support for withstanding forces exerted on battery 110, e.g., during maneuvering of vehicle 100, a crash, or the like.

Figure 2:
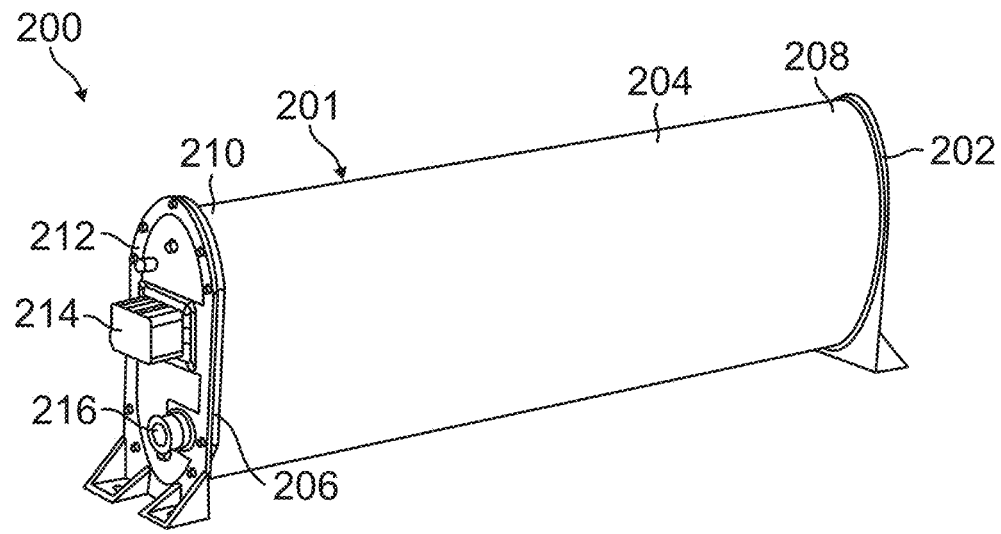
FIG. 2 is a perspective view of an example aerospace battery, in accordance with one or more techniques of this disclosure.

FIG. 2 is a perspective view of an example aerospace battery 200, in accordance with one or more techniques of this disclosure. Aerospace battery 200 includes a housing 201 that includes a first endplate 202, an elliptical cylinder 204, and a flange 206. Elliptical cylinder 204 extends from a first cylinder end 208 to a second cylinder end 210. First cylinder end 208 interfaces with and attaches to first endplate 202. Second cylinder end 210 interfaces with and attaches to flange 206.

Elliptical cylinder 204 may be formed from at least one sheet of material. The at least one sheet of material may include a first sheet end and a second sheet end, which may be substantially perpendicular to first cylinder end 208 and second cylinder end 210. The first and second sheet ends may be welded together to form the wall of elliptical cylinder 204. The weld may be a laser welded butt joint, a laser welded interlocking finger joint, a lapped braised joint, or any other suitable joint for joining sheets of material.

The at least one sheet of material of elliptical cylinder 204 may be formed of at least one material with a wall thickness such that elliptical cylinder 204 is configured to remain intact in the event of an explosion or thermal runaway within housing 201. For example, the at least one sheet of material may include materials that have high yield stress, high temperature capability, or both. The at least one sheet of material may include a single layer or more than one layer, such as a plurality of sheets laminated together. For instance, an inner layer may be formed on a material that exhibits high temperature capability (e.g., titanium, a titanium alloy, or a steel) while an outer layer exhibits lower temperature capability but provides mechanical properties (e.g., an aluminum alloy). In general, the at least one sheet of material of elliptical cylinder 204 may include aluminum, an aluminum alloy, a steel, copper, a copper alloy, titanium, a titanium alloy, a plastic, a paper, or the like. In some examples, an inner layer of the at least one sheet of material may be formed as a Faraday cage to reduce of substantially eliminate electromagnetic fields across elliptical cylinder 204.

As another example, the at least one sheet of material may include multiple metal sheets and multiple other sheets. For instance, elliptical cylinder 204 may a first layer including a metal sheet, a second layer including a paper, a third layer including a metal sheet, and a fourth layer including a paper. The first layer may be an outer layer of elliptical cylinder 204 and the fourth layer may be an inner layer of elliptical cylinder 204. The metal sheets may include any suitable metal, such as a steel, titanium, or the like. The paper layers may each include one or more sheets of a paper, such as FyreWrap®, available from Unifrax, Tonawanda, New York. Such a construction may reduce or substantially eliminate penetration of the enclosure by battery cells in the event of a thermal event.

By including elliptical cylinder 204, the materials of housing 201 may experience reduced stress compared to a conventional rectangular housing (e.g., during an off-gas explosion). Although spheres and cylinders may result in the materials of housing 201 experiencing even less stress, spheres or cylinders may occupy larger total volume when sized to enclose a rectangular solid, such as the battery pack core in aerospace battery 200. By reducing the stress experienced by the materials of housing 201, the thickness and weight of housing 201 may be reduced.

First endplate 202 and flange 204 may be formed from a metal, such as aluminum, an aluminum alloy, a steel, copper, a copper alloy, titanium, a titanium alloy, or the like. First endplate 202 and flange 204 may be welded to first cylinder end 208 and second cylinder end 210, respectively.

Aerospace battery 200 also includes a second endplate 212. Second endplate 212 is configured to be removably attached to flange 204. For examples, second endplate 212 may be removably attached to flange 204 using a plurality of fasteners, such as bolts.

Second endplate 212 may include one or more electrical connector 214, which allow the battery pack core within housing 201 to be electrically connected to a circuit, such as an electrical bus. One or more electrical connector 214 may conform to any selected electrical connector standard.

Second endplate 212 also may include an exhaust vent 216, which is configured to let gases out from the internal volume of housing 201, e.g., when pressure within housing 201 is above a threshold amount.

Figure 3:
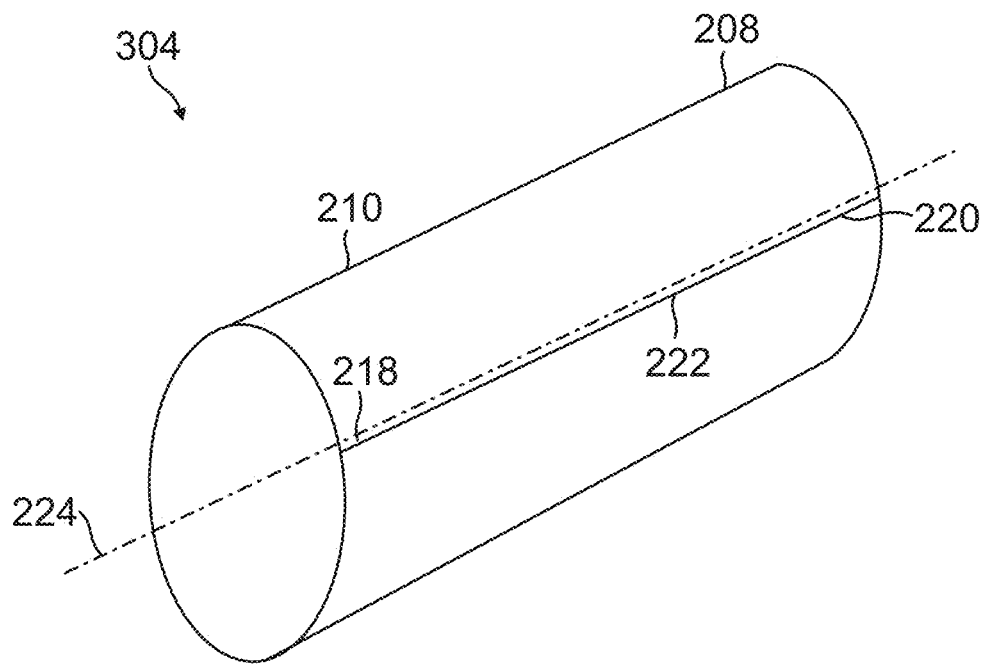
FIG. 3 is a perspective view of another example elliptical cylinder for a housing of an aerospace battery, in accordance with one or more techniques of this disclosure.

As described above, in some examples, elliptical cylinder 204 may be formed from at least one sheet of material. FIG. 3 is a perspective view of another example elliptical cylinder 304 for a housing of an aerospace battery, in accordance with one or more techniques of this disclosure. As shown in FIG. 3, elliptical cylinder 304 includes a first cylinder end 308, a second cylinder end 310, first sheet end 318, and second sheet end 320. First sheet end 318 is welded to second sheet end 320 at weld 322. Weld 322 may be a welded butt joint, a welded interlocking finger joint, a lapped braised joint, or any other suitable joint for joining sheets of material, such as metal sheets.

Weld 322 may extend generally parallel to longitudinal axis 324 of elliptical cylinder 304 (and housing 201 shown in FIG. 2). Weld 322 may be the single weld for elliptical cylinder 304. By forming elliptical cylinder from at least one sheet of material with a single weld, the fabrication process is simplified, control of manufacturing can be improved, and manufacturing costs can be reduced (e.g., compared to an elliptical cylinder formed using other techniques).

Figure 4:
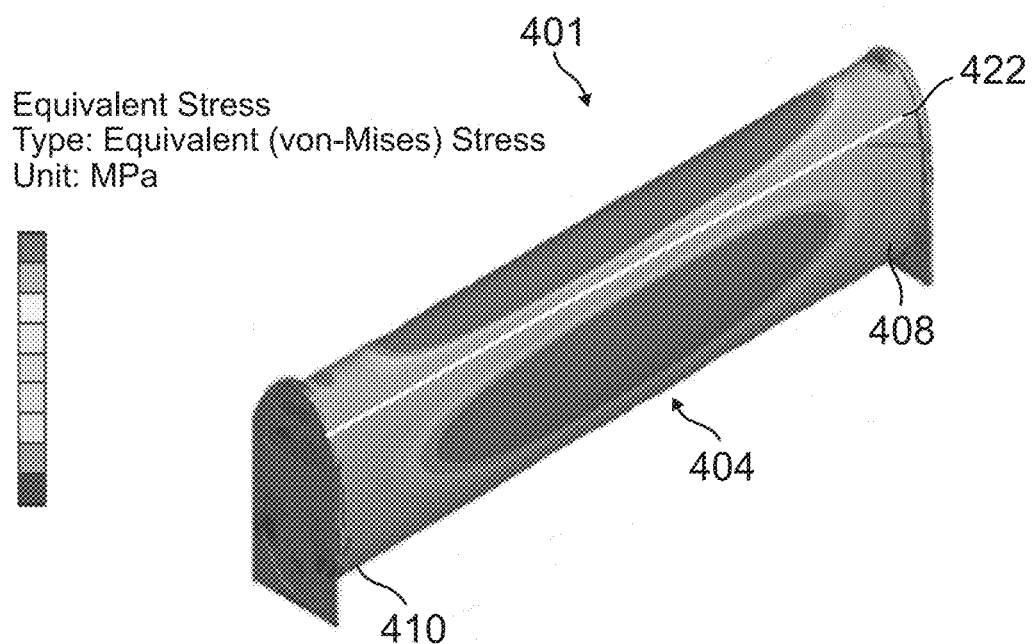
FIG. 4 is a perspective view of another example housing for an aerospace battery, illustrating calculated stress levels for the example housing as a function of location.

In some examples, weld 322 may be located at a location that experiences relatively low stress when the internal volume of housing 201 is pressurized. For example, FIG. 4 is a perspective view of another example housing 401 for an aerospace battery, illustrating calculated stress levels for the example housing 401 as a function of location. As shown in FIG. 4, weld 422 runs from first cylinder end 408 to the second cylinder end 410 at a perimeter location that is calculated to experience a reduced stress compared to at least some other perimeter locations during pressurization of housing 401. In some examples, weld 422 runs from first cylinder end 408 to the second cylinder end 410 at a perimeter location that is calculated to experience substantially a lowest average pressure along the length of the weld. As used herein, the perimeter is in a plane substantially normal to the long axis of housing 401. In other words, for each perimeter location, an average stress may be calculated along the length of elliptical cylinder 404 (parallel to the longitudinal axis of housing 401). Weld 422 may be located at a perimeter location that has an average stress within a lowest 10% or a lowest 5% of average stresses for all perimeter locations for which stresses were calculated. In this way, weld 422, which may be the weakest portion of elliptical cylinder 404, may experience relatively low pressures if the internal volume of housing 401 is pressurized.

Figure 5:
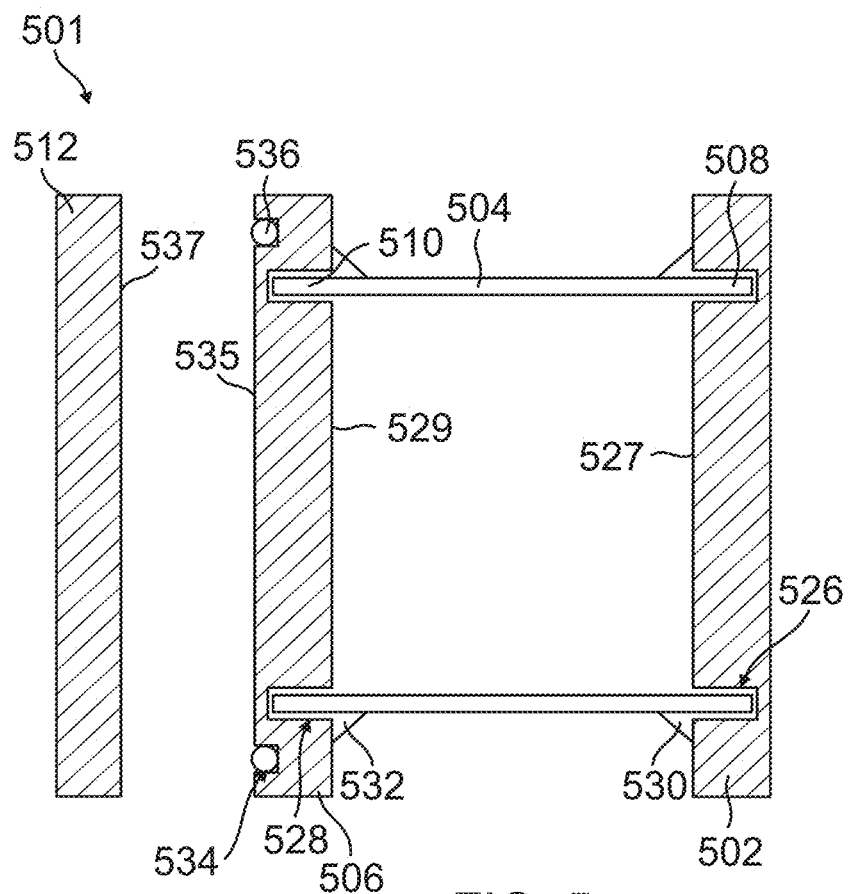
FIG. 5 is a cross-sectional diagram of an example housing for an aerospace battery, in accordance with one or more techniques of this disclosure.

The elliptical cylinder (e.g., elliptical cylinder 204, 304, 404) may be attached to the flange and first endplate using a relatively simple joint. For example, FIG. 5 is a cross-sectional diagram of an example housing 501 for an aerospace battery, in accordance with one or more techniques of this disclosure. Housing 501 include a first endplate 502, an elliptical cylinder 504, a flange 506, and a second endplate 512. First endplate 502, elliptical cylinder 504, flange 506, and second endplate 512 may be similar to or substantially the same as corresponding structures described in FIGS. 2-4, aside from the differences described herein.

First endplate 502 includes a groove 526 defined in first major surface 527, which faces an interior of housing 501. Groove 526 defines a shape corresponding to a cross-sectional shape of elliptical cylinder 504 (e.g., an elliptical shape to match the elliptical cross-section in the plane orthogonal to a long axis of elliptical cylinder 504). This may result in groove 526 helping to shape elliptical cylinder 504 and/or helping to maintain elliptical cylinder 504 in its desired cross-sectional shape. Groove 526 may have a width and depth selected to allow first end 508 of elliptical cylinder 504 to seat within groove 526. In some examples, surfaces of first end 508 may contact and engage with surfaces of groove 526, e.g., groove may have a width that substantially corresponds to a thickness of the wall of elliptical cylinder 504.

First end 508 of elliptical cylinder 504 may be welded to first endplate 502 adjacent to groove 526. This fixes first end 508 of elliptical cylinder 504 relative to first endplate 502 and forms a seal between first end 508 of elliptical cylinder 504 and first endplate 502. Any suitable welding technique may be used to weld first end 508 of elliptical cylinder 504 and first endplate 502, such as laser welding, arc welding, electron beam welding, ultrasonic welding, or the like.

Flange 506 includes a first groove 528 defined in a first major surface 529, which faces an interior of housing 501. First groove 528 defines a shape corresponding to a cross-sectional shape of elliptical cylinder 504 (e.g., an elliptical shape to match the elliptical cross-section in the plane orthogonal to a long axis of elliptical cylinder 504). This may result in first groove 528 helping to shape elliptical cylinder 504 and/or helping to maintain elliptical cylinder 504 in its desired cross-sectional shape. Groove 528 may have a width and depth selected to allow second end 510 of elliptical cylinder 504 to seat within groove 528. In some examples, surfaces of second end 510 may contact and engage with surfaces of groove 528, e.g., groove may have a width that substantially corresponds to a thickness of the wall of elliptical cylinder 504.

Second end 510 of elliptical cylinder 504 may be welded to flange 506 adjacent to groove 528. This fixes second end 510 of elliptical cylinder 504 relative to flange 506 and forms a seal between second end 510 of elliptical cylinder 504 and flange 506. Any suitable welding technique may be used to weld second end 510 of elliptical cylinder 504 and flange 506, such as laser welding, arc welding, electron beam welding, ultrasonic welding, or the like.

Flange 506 also includes a second groove 534 defined in a second major surface 535. Second major surface 535 is opposite first major surface 529. Second groove 534 is sized to accept a gasket 536. Second groove 534 and gasket 536 are positioned in second major surface 535 to surround an aperture or opening in flange 506, which admits introduction of a battery pack core into the interior of housing 501 after first endplate 502 and flange 506 are attached (e.g., welded) to each other. In some examples, the aperture is rectangular, and second groove 534 is rectangular or elliptical.

Second endplate 512 is configured to be attached to flange 506, for example, by being bolted to flange 506 using a plurality of bolts that extend through bolt holes arranged near a perimeter of second endplate 512 and flange 506. Other suitable fasteners may be used instead of bolts. When second endplate 512 is attached to flange 506, first surface 537 of second endplate 512 seats against second surface 535 and engages with gasket 536 to seal the internal volume of housing 501.

By constructing housing 501 as shown in FIG. 5, first endplate 502 and second endplate 506 may be welded to elliptical cylinder 504 prior to insertion of the battery pack core within the internal volume of housing 501. This may ensure that that the battery pack core is not inadvertently damaged during the welding process. Further, housing 501 only has a single non-fixed interface (between flange 506 and second endplate 512), which may improve sealing of housing 501. Sealing may be important to reduce or substantially prevent smoke and/or flame from exiting housing 501 and entering the aircraft during an explosion or fire. Housing 501 may be essentially hermetically sealed aside from an exhaust vent.

Figure 6:
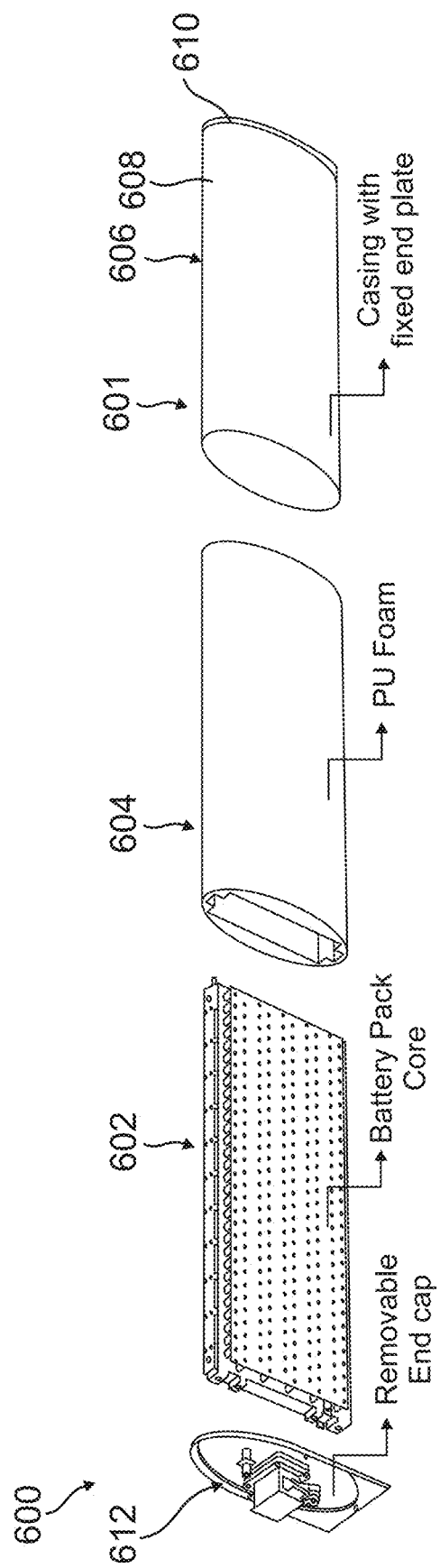
FIG. 6 is an exploded perspective view of an example aerospace battery, in accordance with one or more techniques of this disclosure.

As described above, in some examples, an aerospace battery may include a fire-resistant fill material, which may reduce or substantially eliminate free volume within the housing for flammable materials or gases. FIG. 6 is an exploded perspective view of an example aerospace battery 600, in accordance with one or more techniques of this disclosure. Aerospace battery 600 includes a housing 601, a battery pack core 602, and a fill material 604. Housing 601 includes a first portion 606, which includes elliptical cylinder 608 and first endplate 610, and a second portion 612, which includes a flange and second endplate. As shown in FIG. 6, fill material 604 may fill substantially all the space between battery pack core 602 and an inner surface of housing 601.

Figure 7:
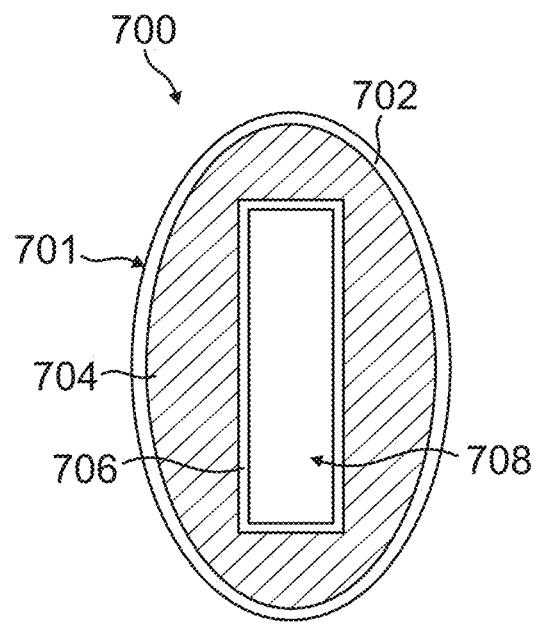
FIG. 7 is a cross-sectional diagram of another example aerospace battery, in accordance with one or more techniques of this disclosure.

FIG. 7 is a cross-sectional diagram of another example aerospace battery 700, in accordance with one or more techniques of this disclosure. FIG. 7 is a cross section taken in the plane substantially orthogonal to a long axis of a housing 701 of aerospace battery 700. FIG. 7 shows elliptical cylinder 702, and a fill material that includes a closed cell foam 704 and a ceramic felt 706. FIG. 7 also shows a cavity 708 in which a battery pack core (e.g., battery pack core 602) may be disposed.

Closed cell foam 704 may include a polymer foam. Polymer foam may be more resilient (e.g., have a higher facture resistance than a ceramic foam, while still offering relatively low thermal conductivity, temperature withstand capability, and light weight. In some examples, the polymer foam is a closed cell foam, e.g., in which at least some of the pores are not interconnected. This may reduce or substantially eliminate gas flow through the foam.

In some examples, closed cell foam 704 may include a polyurethane foam. In some implementations, polyurethane foam may be filled with a fire retardant material. In some examples, up to 15% of the volume of closed cell foam 704 may be filled with fire retardant material. In this way, closed cell foam 704 may resist burning.

Closed cell foam 704 acts as a thermal insulation for elliptical cylinder 702 (and the flange and end walls), which may reduce temperatures to which elliptical cylinder 702 (and the flange and end walls) are heated if a thermal event occurs within the battery enclosure. Closed cell foam 704 also may add mechanical support, rigidity, and/or impact absorption to housing 701 and elliptical cylinder 702.

Ceramic felt 706 is positioned to line the battery pack core. If battery pack core experiences a thermal event, temperatures at the location of the thermal event may reach between 800° C. and 1000° C. Ceramic felt 706 may have temperature capability (e.g., thermal stability) to withstand such temperatures. In some examples, ceramic felt 706 may be an alumina-silicate felt. Ceramic felt 706 may be a non-woven felt.

Together, closed cell foam 704 and ceramic felt 706 may fill free space within the housing 701 (e.g., space not occupied by the battery pack core). By limiting free space, the amount of combustible gas within housing 701 may be reduced, and an electrolyte that is released by a battery cell within the battery pack core may be contained to a smaller area. Further, closed cell foam 704 and ceramic felt 706 may limit flow of gas within housing 701, which may reduce provision of oxygen to a fire and reduce the rate of burning. This may also reduce the risk of explosion.

Further, closed cell foam 704 and ceramic felt 706 may reduce acceleration of deflagration wavefronts within the internal volume of housing 701. This may reduce the likelihood of deflagration transitioning to detonation. Closed cell foam 704 may be compressible and offer viscous damping of motion of fluid within housing 701. In the event of an off-gas explosion inside housing 701, closed cell foam 704 may compress under pressure, allowing combustion products to expand. Closed cell foam 704 may redistribute localized stress concentration over a larger area of housing 701 (e.g., elliptical cylinder 702). Additionally or alternatively, closed cell foam 704 may reduce the rate of rise in pressure exerted on housing 701 in the event of an off-gas explosion inside housing 701.

Because housing 701 is essentially hermetically sealed aside from an exhaust vent, in the event of an off-gas explosion or fire, products of combustion, such as hot gas and smoke, expand and exhaust through the exhaust vent (e.g., exhaust vent 216 of FIG. 2). The flow of the combustion products may make it difficult from oxygen to flow into the interior of housing 701 to feed the fire. This may reduce a burn rate of the fire, result in incomplete combustion, and maintain a temperature within housing 701. This may reduce a temperature to which housing 701 is exposed, reducing a likelihood that housing 701 is breached.

Closed cell foam 704 and ceramic felt 706 may fill a majority of free space within housing 701 (i.e., volume within housing 701 that is not occupied by the battery pack core). In some examples, closed cell foam 704 and ceramic felt may fill at least 75% of the free volume within the housing. In other examples, closed cell foam 704 and ceramic felt may fill at least 75% of the free volume within the housing.

Figure 8:
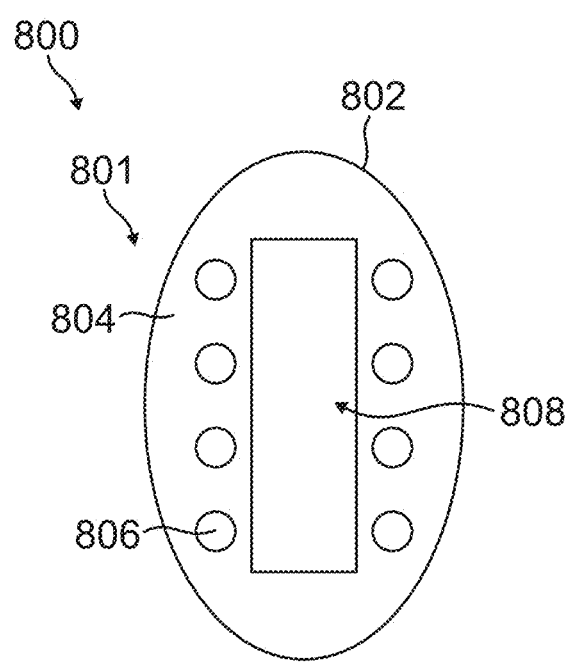
FIG. 8 is a cross-sectional diagram of another example aerospace battery, in accordance with one or more techniques of this disclosure.

FIG. 8 is a cross-sectional diagram of another example aerospace battery 800, in accordance with one or more techniques of this disclosure. FIG. 8 is a cross section taken in the plane substantially orthogonal to a long axis of a housing 801 of aerospace battery 800. FIG. 8 shows elliptical cylinder 802 and a fill material 804. FIG. 8 also shows a cavity 808 within in which a battery pack core (e.g., battery pack core 602) may be disposed. Although FIG. 8 does not illustrate closed cell foam and ceramic felt separately, fill material 804 may include closed cell foam and ceramic felt. The closed cell foam and ceramic felt may be similar to or substantially the same as those described with respect to FIG. 7.

In the example shown in FIG. 8, fill material 804 of aerospace battery 800 includes a plurality of embedded void spaces 806. Embedded void spaces 806 may enclose non-combustible gas. Embedded void spaces 806 may have walls defined by the closed cell foam, or by a separate material, such as a plastic bag or pouch used to define the shape of embedded void spaces 806.

Aerospace battery 800 may include any number of embedded void spaces 806. For example, aerospace battery 800 may include eight embedded void spaces 806 as shown in FIG. 8 or may include more or fewer than eight embedded void spaces 806.

Embedded void spaces 806 act as compressible spaces that may allow combustion products to expand and may reduce the rate of rise in pressure exerted on housing 801 in the event of an off-gas explosion inside housing 801. Embedded void spaces 806 also may act to reduce a weight of aerospace battery 800, as the non-combustible gas may be less dense that the closed cell foam.

Figure 9:
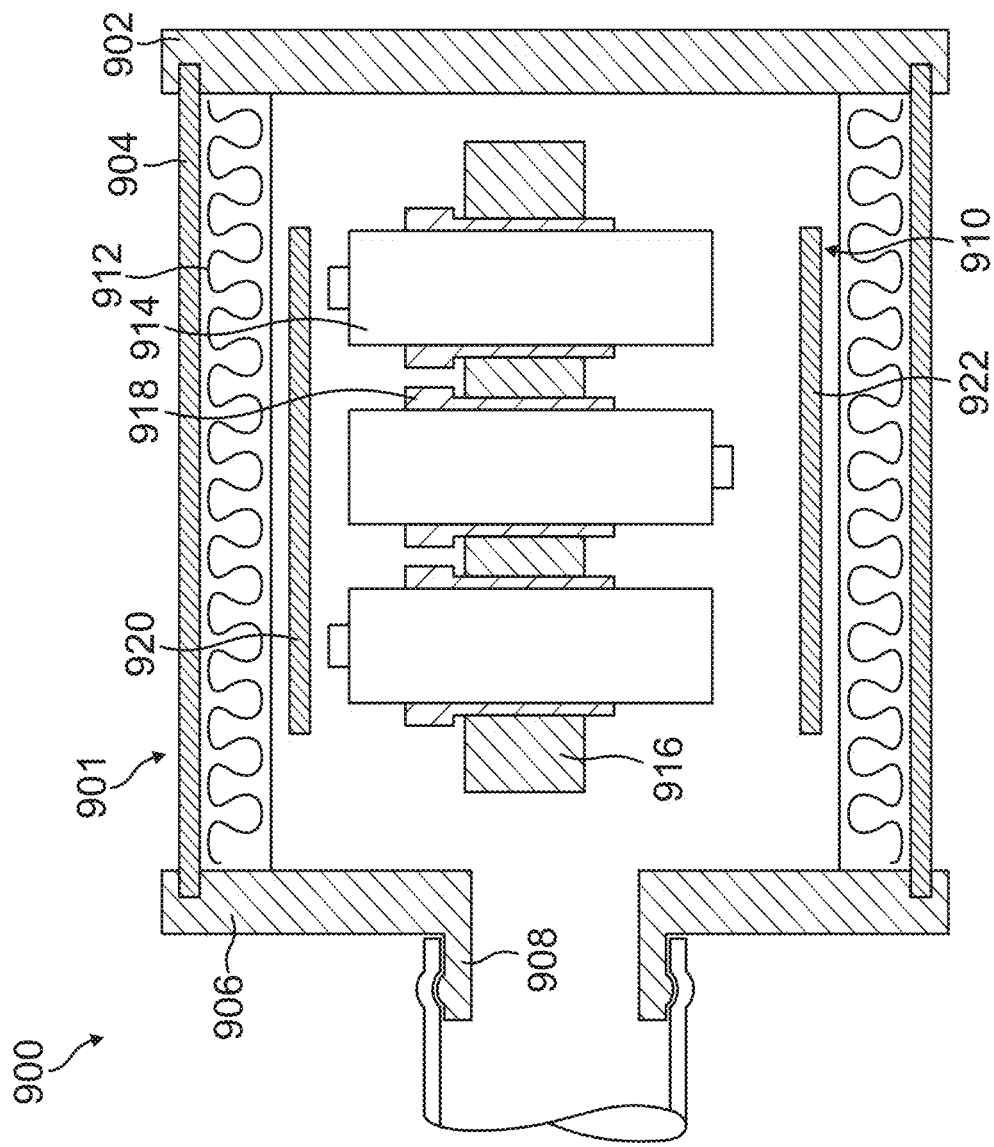
FIG. 9 is a cross-sectional diagram of another example aerospace battery, in accordance with one or more techniques of this disclosure.

An aerospace battery also may include a battery pack core that haves one or more features that reduce a chance of fire or explosion in the aerospace battery. FIG. 9 is a cross-sectional diagram of another example aerospace battery 900, in accordance with one or more techniques of this disclosure. The cross-section shown in FIG. 9 is taken along the long axis of a housing (e.g., long axis 224 shown in FIG. 3). Aerospace battery 900 includes a housing 901 that includes a first endplate 902, an elliptical cylinder 904, and a second endplate 906. Second endplate 906 includes an exhaust vent 908. Each of these components may be similar to or substantially the same as corresponding components described above.

Aerospace battery 900 also includes a battery pack core 910 and a closed cell foam 912 that fills at least a portion of the free volume within housing 901 (e.g., between battery pack core 910 and housing 901). Battery pack core 910 includes a plurality of battery cells 914, cold plate 916, a plurality of silicone bushings 918, and busbars 920 and 922. Battery cells 914 may include any type of battery cell, such as a lithium-ion battery cell, a lithium-polymer battery cell, a zinc-carbon battery cell, an alkaline battery cell, a nickel-cadmium battery cell, a nickel-metal hydride battery cell, or the like. In some examples, battery cells 914 include 18650 lithium-ion battery cells. Battery pack core 910 may include any number of battery cells, such as tens, hundreds, or thousands of battery cells.

Cold plate 916 defines a plurality of apertures that extend between a first major surface of cold plate 916 and a second major surface of cold plate 916. A single battery cell of battery cells 914 may be positioned in each aperture. As such, cold plate 916 may include the same number of apertures as aerospace battery 900 includes battery cells.

In some implementations, cold plate 916 also may be a structural member of aerospace battery 900. For instance, cold plate 916 may contribute mechanical strength to provide support for withstanding forces exerted on aerospace battery 900, e.g., during maneuvering of the vehicle in which aerospace battery 900, a crash, or the like. For instance, cold plate 916 supports battery cells 914 and reduces or substantially prevents relative movement among battery cells 914 due to forces exerted on aerospace battery 900.

Battery cells 914 may be retained in cold plate 916 with silicone bushings 918. A single silicone bushing 918 may surround a portion of the circumference (or perimeter) of each battery cell of the plurality of battery cells 914. Silicone bushings 918 may be sized to fit tightly around the portion of the circumference (or perimeter) of each battery cell (e.g., may friction fit around the portion of the circumference (or perimeter) of each battery cell). Silicone bushings 918 also may be sized to contact and fit tightly against the wall of each aperture in cold plate 916. Each silicone bushing 918 extends from a first ends that extends beyond the first major surface to a second end that extends beyond the second major surface of cold plate 916. By extending beyond the first and second major surfaces of cold plate 916, silicone bushings 918 may provide clearance against creepage and high voltage arcing between battery cells 914 and cold plate 916.

Busbars 920 and 922 are used to conduct electrical power between battery cells 914 and the electrical system to which aerospace battery is electrically connected.

Figure 10:
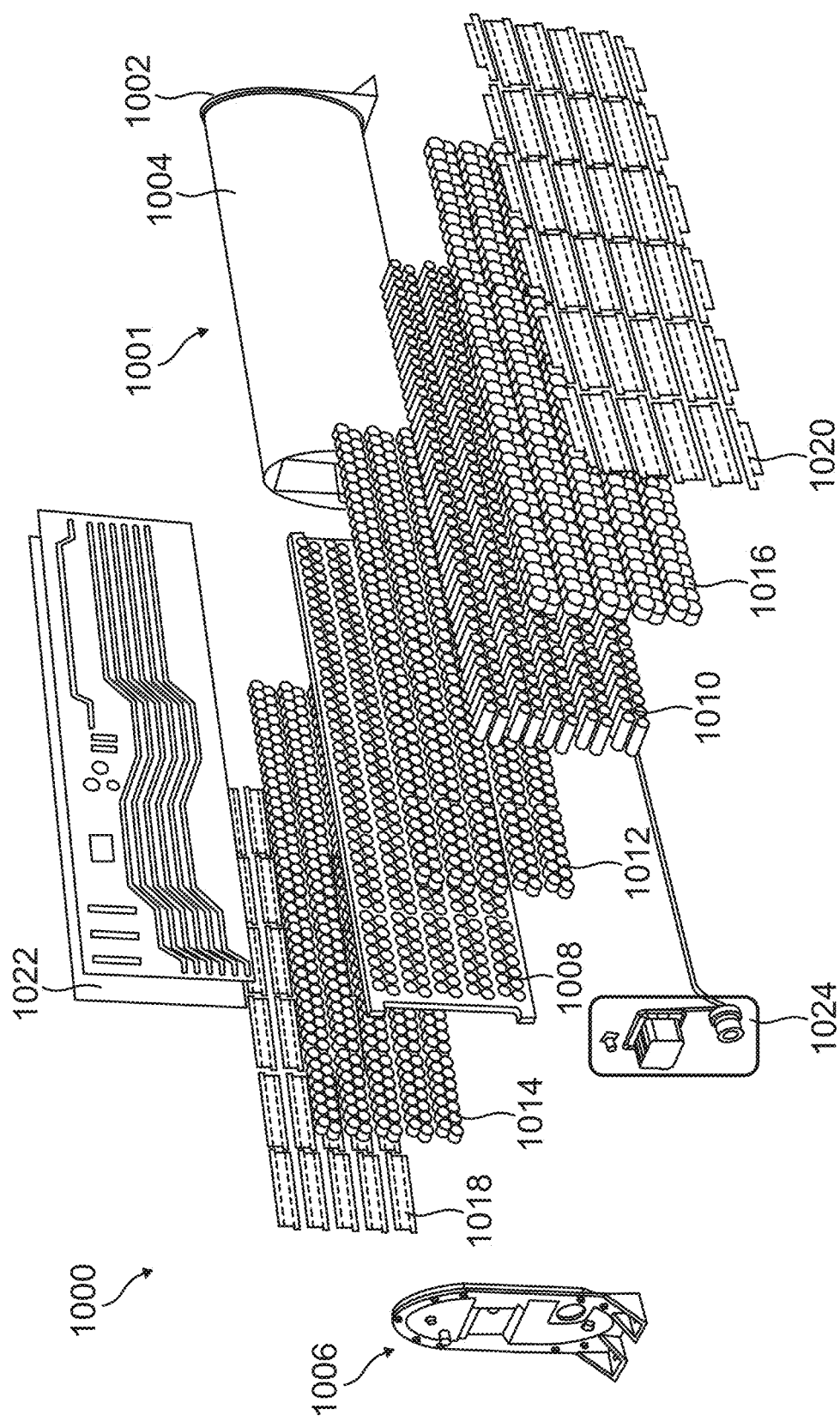
FIG. 10 is an exploded view of another example aerospace battery, in accordance with one or more techniques of this disclosure.

FIG. 10 is an exploded view of another example aerospace battery 1000, in accordance with one or more techniques of this disclosure. FIG. 10 shows additional details regarding a battery pack core. Like other aerospace batteries described herein, aerospace battery 1000 includes a housing 1001, which includes a first portion including a first endplate 1002 and elliptical cylinder 1004, and a second portion 1006, which includes a flange and a second endplate. The components may be similar to or substantially the same as any of the examples described herein.

The battery pack core includes cold plate 1008, a plurality of battery cells 1010, a plurality of silicone bushings 1012, a first support fixture 1014, a second support fixture 1016, a first busbar 1018, a second busbar 1020, a circuit board 1022, and an electrical connector 1024. Cold plate 1008, plurality of battery cells 1010, plurality of silicone bushings 1012, first busbar 1018, and second busbar 1020 may be similar to or substantially the same as the corresponding structures described with reference to FIG. 9, aside from differences described herein.

When assembled, the plurality of silicone bushings 1012 surround the plurality of battery cells 1010, with a single silicone bushing 1012 surrounding a circumference of each battery cell and extending part of the length of each battery cell. A first end and a second, opposite end of each battery cell extend beyond the ends of the silicone bushing. First and second support fixtures 1016 and 1018 each include a plurality of apertures, and the apertures in each may correspond in number and position to the apertures in cold plate 1008. First and second support fixtures 1016 and 1018 surround the first end and the second end, respectively, of each battery cell, and may contact surfaces of cold plate 1008. First support fixture 1016 supports and spaces first busbar 1018 from cold plate 1008. Similarly, second support fixture 1018 supports and spaces second busbar 1020 from cold plate 1008. First and second support fixtures 1018 may be formed from any suitable material, such as an electrically insulative material to electrically isolate busbars 1018 and 1020 from cold plate 1008.

Busbars 1018 and 1020 electrically connect plurality of battery cells 1010 to electrical connector 1024. Busbars 1018 and 1020 may connect sets of battery cells from plurality of battery cells 1010 in series, in parallel, or in a combination of series and parallel. The particular electrical connection configuration may be selected based on the electrical characteristics of the plurality of battery cells 1010, the number of battery cells 1010, and the desired electrical output from aerospace battery 1000. Busbars 1018 and 1020 may be formed from any suitable electrically conductive material, such as, for example, gold, a gold alloy, silver, a silver alloy, copper, a copper alloy, aluminum, an aluminum alloy, nickel, a nickel alloy, combinations thereof (e.g., a copper and nickel laminate), or the like.

Circuit board 1022 may include circuitry configured to manage the battery core pack, e.g., discharging and charging of the plurality of battery cells 1010.

Cold plate 1008 may provide mechanical support for and cooling for the plurality of battery cells 1010. Cold plate 1008 may be formed form a thermally conductive material, such as a metal or alloy. For example, cold plate 1008 may be formed from copper, a copper alloy, aluminum, an aluminum alloy, nickel, a nickel alloy, combinations thereof, or the like.

Figure 11:
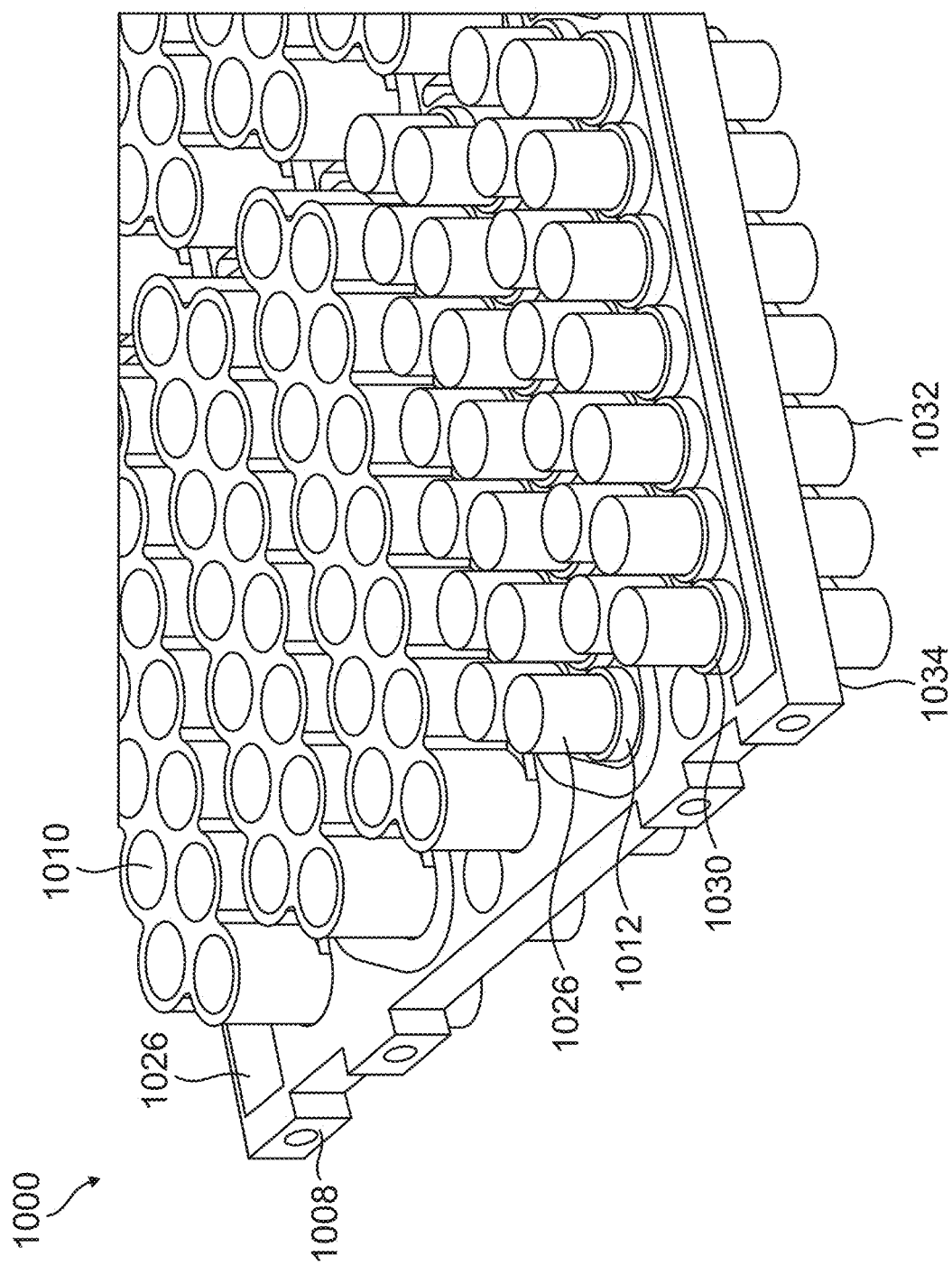
FIG. 11 is a perspective view of a portion of a cold plate, a plurality of battery cells, a plurality of silicone bushings, and a first support fixture, in accordance with one or more techniques of this disclosure.

FIG. 11 is a perspective view of a portion of cold plate 1008, the plurality of battery cells 1010, the plurality of silicone bushings 1012, and first support fixture 1016. As shown in FIG. 11, a single battery cell is disposed in each aperture in cold plate 1008, and a single silicone bushing surrounds a circumference of each battery cell. Each silicone bushing of silicone bushings 1012 is in intimate contact with a corresponding circumference of a battery cell and with a wall of an aperture. Each silicone bushing of silicone bushings 1012 has a selected wall thickness, such as between about 1 mm and about 5 mm, or about 1.5 mm.

Silicone bushings 1012 may exhibit one or more of a number of characteristics that help reduce or substantially eliminate risk of fire or explosion within aerospace battery 1000. For example, silicone bushings 1012 may electrically insulate battery cells 1010 from cold plate 1008. Some silicones may exhibit greater than 20 kV/mm electrical isolation. Silicone bushings 1012 also may remain elastic over a wide range of temperatures, which may help avoid damage to silicone bushings 1012 and maintain battery cells 1010 within their corresponding apertures. Some silicones maintain elastic at temperatures as low as −50° C. and/or temperatures as high as 80° C. This range of temperatures may cover substantially all the normal operating temperatures experienced by silicone bushings 1012. Silicones also are available in a wide range of Shore hardnesses so that the compressive force between cold plate 1008 and battery cells 1010 may be selected to provide intimate thermal contact and mechanical support without damaging battery cells 1010.

Silicones also may have high thermal stability, e.g., may not degrade at temperatures up to 200° C. Upon exposure to high temperatures (e.g., temperatures above 200° C., silicones do not combust. Rather, silicones will degrade. Thus, silicone will not contribute to risk of fire or explosion.

Silicones also can be selected to have high tear strength, to be hydrophobic, and/or to be able to be fabricated using molding. Hydrophobicity may result in silicone bushings not absorbing water from the environment in which aerospace battery 1000 is used, which may reduce a risk of short circuits.

As shown in FIG. 11, a first end of 1026 of each of battery cells 1010 extends beyond first major surface 1028 of cold plate 1008 and beyond a first end 1030 of silicone bushings 1012. A second end 1032 of each of battery cells 1010 extends beyond a second major surface 1034 of cold plate 1008 and beyond a second end of silicone bushings 1012. First support fixture 1016 may contact first major surface 1018 of cold plate 1008 and surround first end 1026 of battery cells 1010 and first end 1030 of silicone bushings.

Figure 12:
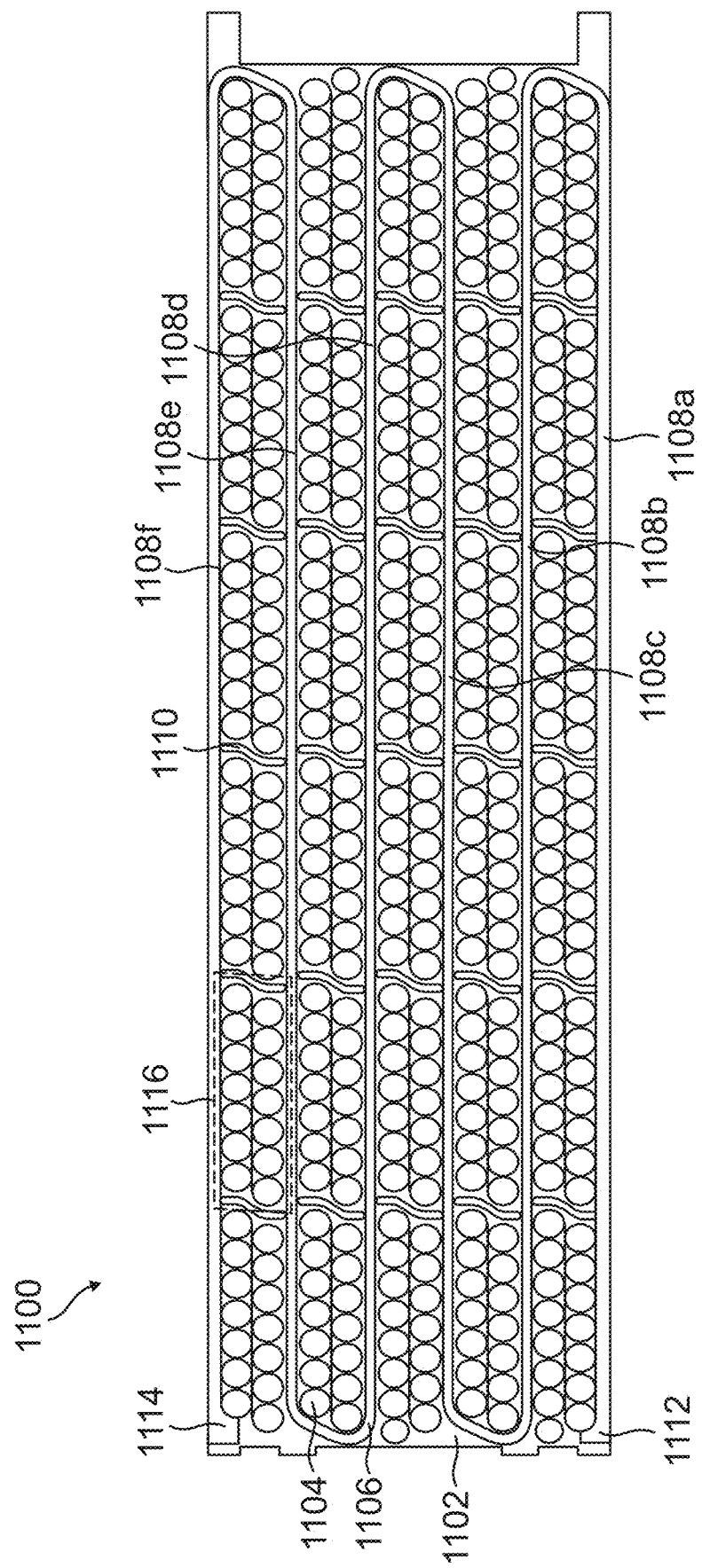
FIG. 12 is a plan diagram of an example cold plate, in accordance with one or more techniques of this disclosure.

FIG. 12 is a plan diagram of an example cold plate 1100, which may be an example of cold plate 1008 of FIG. 10 and/or cold plate 916 of FIG. 9. Cold plate 1100 includes a substrate 1102 that defines a plurality of apertures 1104. Substrate 1102 also defines at least one liquid cooling channel 1106. The at least one liquid cooling channel 1106 includes a plurality of parallel channel sections 1108a-1108f (collectively, "parallel channel sections 1108"). Additionally, substrate 1102 defines a plurality of thermal break apertures 1110, only one of which is labelled in FIG. 12 for clarity.

At least one liquid cooling channel 1106 is configured to connect to a larger fluid circuit, which may include a pump that is configured to pump a cooling liquid, such as water, an alcohol, or the like, through the at least one liquid cooling channel 1106. As such, at least one liquid cooling channel 1106 may include an inlet and outlet to allow liquid entry into and exit from at least one liquid cooling channel 1106. For instance, at least one liquid cooling channel 1106 may include an inlet 1112 and an outlet 1114. In some implementations, at least one liquid cooling channel 1106 may include a single inlet and a single outlet. In other examples, at least one liquid cooling channel 1106 may include a plurality of inlets and/or a plurality of outlets.

At least one liquid cooling channel 1106 includes a plurality of parallel channel sections 1108. In the example shown in FIG. 12, at least one liquid cooling channel 1106 includes six parallel channel sections 1108. In other examples, at least one liquid cooling channel 1106 may include more or fewer parallel channel sections 1108. In examples in which at least one liquid cooling channel 1106 includes a plurality of inlets and/or outlets, each of parallel channel sections 1108 may be fluidly connected to a corresponding inlet and/or outlet. In other examples, as shown in FIG. 12, more than one of parallel channel sections 1108 may be fluidly connected to inlet 1112 and/or outlet 1114. In some examples, all parallel channel sections 1108 may be fluidly connected to a single inlet 1112 and a single outlet 1114.

In some examples, at least one liquid cooling channel 1106 may include a serpentine liquid cooling channel as shown in FIG. 12. In a serpentine liquid cooling channel a turn connects each pair of adjacent parallel channel sections 1108 to form a serpentine or sinusoidal shape.

As shown in FIG. 12, in some examples, at least one liquid cooling channel 1106 and plurality of apertures 1104 may be arranged such that two rows of apertures 1104 are between each pair of adjacent parallel channel sections 1108. This results in each aperture of plurality of apertures 1104 being directly adjacent to at least one liquid cooling channel 1106. This may facilitate heat transfer from each battery cell to liquid within at least one liquid cooling channel 1106, which may enable efficient cooling of the battery cells.

In some examples, substrate 1102 also defines a plurality of thermal break apertures 1110. Each thermal break aperture of the plurality of thermal break apertures 1110 extends from near one parallel channel section to near another parallel channel section. In some implementations, each thermal break aperture of the plurality of thermal break apertures 1110 extends from near one parallel channel section to near another parallel channel section and substantially perpendicularly to the one parallel channel section and the other parallel channel section. The plurality of thermal break apertures 1110 provide an air gap between adjacent groups of apertures 1104. In other words, the plurality of thermal break apertures 1110 and the adjacent parallel channel sections of at least one cooling channel 1106 define a plurality of thermal islands, one of which is labelled as thermal island 1116 in FIG. 12. Thermal island 1116 includes a group of apertures 1104, portions of two thermal break apertures 1110, and portions of two parallel channel sections 1108. The width of thermal break apertures 1110 may be between about 1 mm and about 20 mm, such as about 5 mm.

Thermal islands 1116 may define thermal domains within which heat transfer is relatively easy and across which heat transfer is more difficult. In other words, within thermal island 1116, heat may transfer with relatively low resistance from battery cells positioned in apertures 1104 to the adjacent parallel channel sections 1108 (and to other battery cells positioned within the apertures of the thermal island 1116. On the other hand, the adjacent parallel channel sections 1108 and the thermal break apertures 1110 reduce or substantially prevent heat conduction. This may reduce or substantially eliminate heat transfer from a thermal event in a battery cell within one thermal island 1116 to battery cells in another thermal island. In the event of a thermal event within one thermal island 1116, the thermal break apertures 1110 and adjacent parallel channel sections 1108 may reduce as extent of thermal runaway propagation to other thermal islands.

Thermal island 1116 may include any number of apertures 1104. Fewer apertures 1104 in a thermal island 1116 may improve thermal isolation between battery cells and may increase complexity of cold plate 1100. More apertures 1104 in a thermal island 1116 may reduce thermal isolation between battery cells and may reduce complexity of cold plate 1100. As such, the number of apertures 1104 in a thermal island 1116 may be selected based on a balance between thermal isolation and complexity of cold plate 1100. Additionally, in some examples, electrical connections of battery cells (e.g., via busbars) may affect the number of apertures in a thermal island 1116.

Figure 13:
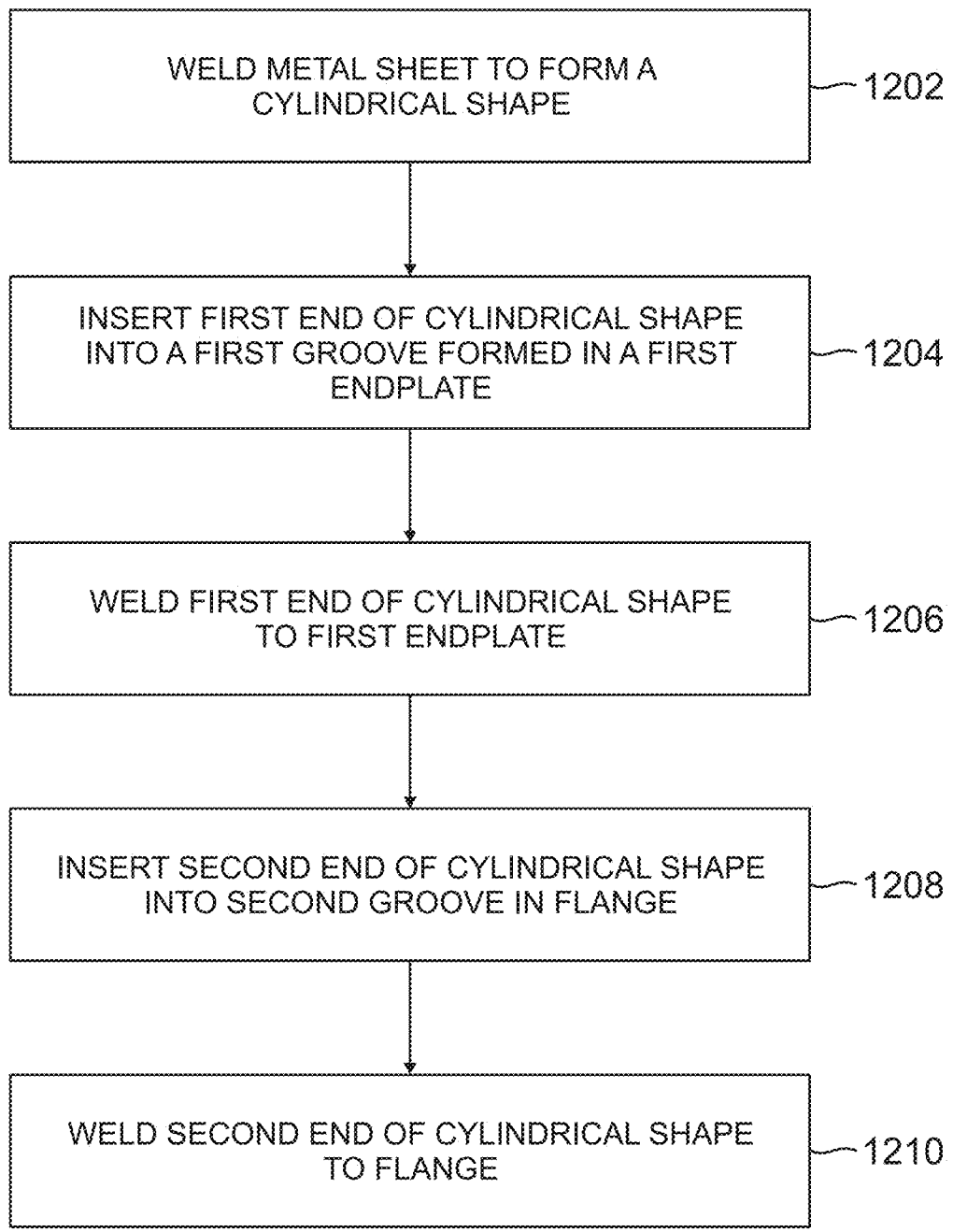
FIG. 13 is an example technique for forming a housing for an aerospace battery, in accordance with one or more techniques of this disclosure.

The example aerospace batteries described herein may be formed by any suitable technique. FIG. 13 is an example technique for forming a housing for an aerospace battery. The technique of FIG. 13 will be described with concurrent reference to FIG. 5, although it will be understood that the technique of FIG. 13 may be used to form other aerospace batteries and the housing 501 may be formed using other techniques.

The technique of FIG. 13 includes welding at least one sheet of material to form a cylindrical shape (1202). The weld may be a laser welded butt joint, a laser welded interlocking finger joint, a lapped braised joint, or any other suitable joint for joining sheets of material, such as metal sheets. In some examples, the cylindrical shape may include an elliptical cylinder. In other examples, the cylindrical shape may include a circular cylinder.

The technique of FIG. 13 also includes inserting a first end 508 of the cylindrical shape into a first groove 526 defined in a first endplate 502 (1204). First groove 526 may define an elliptical shape corresponding to a desired cross-sectional shape of elliptical cylinder 504. First end 508 then may be welded to first endplate 502 (1206).

The technique of FIG. 13 also includes inserting a second end 510 of the cylindrical shape into a first groove 528 defined in a second endplate 506 (1208). First groove 528 may define an elliptical shape corresponding to a desired cross-sectional shape of elliptical cylinder 504. Second end 510 then may be welded to second endplate 506 (1210).

Figure 14:
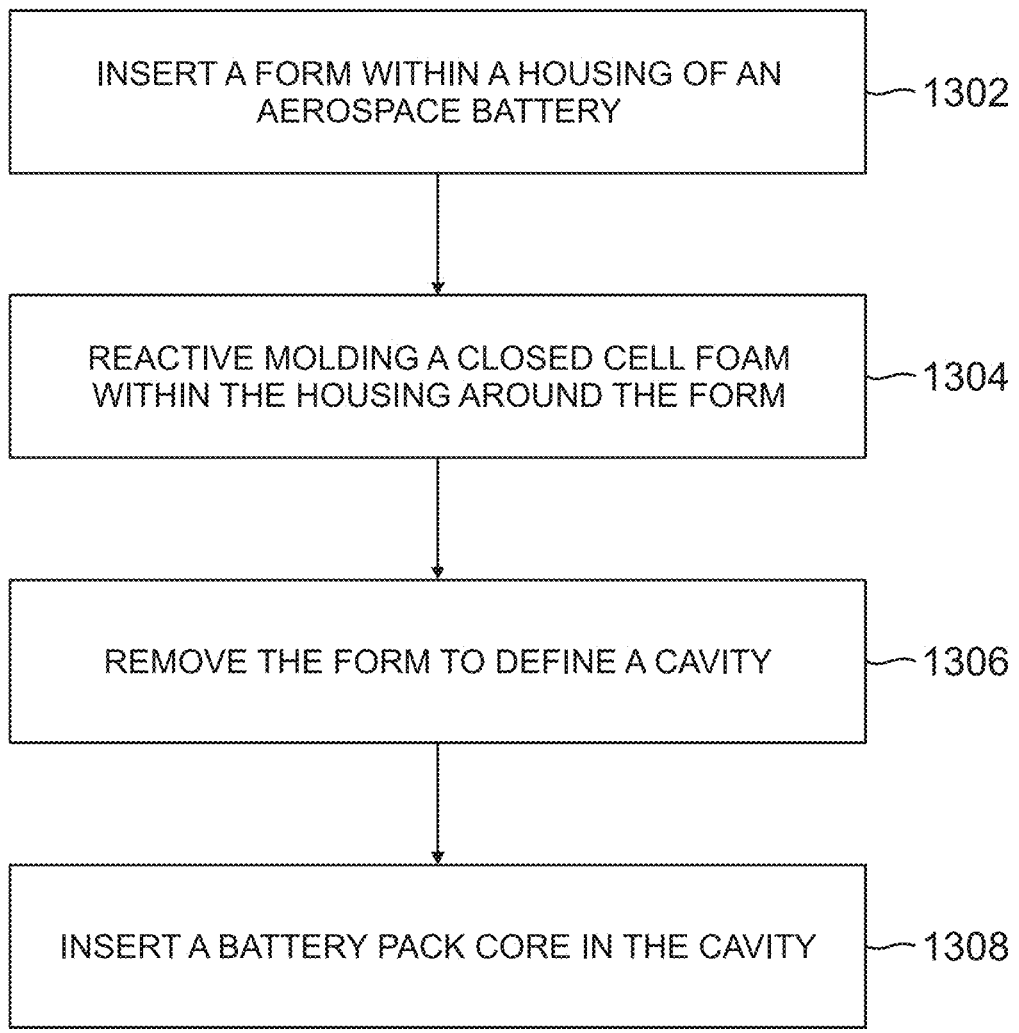
FIG. 14 is an example technique for forming an aerospace battery that includes a fill material between a battery pack core and a housing of the aerospace battery, in accordance with one or more techniques of this disclosure.

FIG. 14 is an example technique for forming an aerospace battery that includes a fill material between a battery pack core and a housing of the aerospace battery. The technique of FIG. 14 will be described with concurrent reference to FIG. 7, although it will be understood that the technique of FIG. 14 may be used to form other aerospace batteries and the aerospace battery 700 may be formed using other techniques.

The technique of FIG. 14 includes inserting a form within a housing 701 of an aerospace battery 700 (1302). The form may have a shape corresponding to an approximate shape of a battery pack core to be housed within housing 701. For instance, the form may be a rectangular solid. The form may include one or more projections to position the form at a desired place within housing 701. The form may be configured to be removed after a foam is formed around the form. For example, the form may be made from a material that thermally decomposes at lower temperatures than the foam to be formed, dissolves in a solvent that is substantially inert to the foam to be formed, or does not adhere to the foam that is formed, so that the form may be removed after the foam is formed.

The technique of FIG. 14 also may include reactive molding a closed cell foam within housing 701 and around the form (1304). For example, the foam may be formed from a two-part reaction mixture, and the two-part reaction mixture may be mixed and injected in housing 701 or the two-part reaction mixture may be mixed within the housing 701.

The technique of FIG. 14 also includes removing the form to define a cavity 708 in the closed cell foam 704 (1306). For example, the form may be physically removed, chemically dissolved, thermally decomposed, or the like.

Finally, the technique of FIG. 14 includes inserting a battery pack core in the cavity (1308).

In some examples, the techniques of FIGS. 13 and 14 may be performed together. For example, the technique of FIG. 14 may be performed after step 1206 or after step 1210 of FIG. 13.

The following examples may illustrate one or more aspects of the disclosure:

Example 1A: A battery housing for an aerospace battery, the battery housing comprising: a first endplate; a flange; and an elliptical cylinder extending from a first cylinder end to a second cylinder end, wherein the first cylinder end of the elliptical cylinder is welded to the first endplate, wherein the second cylinder end of the elliptical cylinder is welded to the flange, wherein the elliptical cylinder is formed from at least one sheet of material comprising a first sheet end and a second sheet end, and wherein the first sheet end is welded to the second sheet end at a weld location that runs from the first cylinder end to the second cylinder end at a perimeter location that is calculated to experience a reduced stress during pressurization of the housing.

Example 2A: The battery housing of example 1A, wherein the elliptical cylinder comprises aluminum, an aluminum alloy, a steel alloy, copper, a copper alloy, titanium, or a titanium alloy.

Example 3A: The battery housing of example 1A or 2A, wherein the flange defines an aperture configured to provide access to an interior of the elliptical cylinder.

Example 4A: The battery housing of example 3A, wherein the flange defines a channel, and wherein the housing further comprises a gasket in the channel.

Example 5A: The battery housing of example 4A, further comprising a second endplate configured to seat against the flange, be attached to the flange, and seal against the gasket.

Example 6A: The battery housing of any one of examples 1A to 5A, wherein the flange further comprises groove in which the second cylinder end is inserted.

Example 7A: The battery housing of any one of examples 1A to 6A, wherein the first endplate further comprises groove in which the first cylinder end is inserted.

Example 8A: The battery housing of any one of examples 5A to 7A, wherein the second endplate further comprises an electrical connector.

Example 9A: The battery housing of any one of examples 5A to 8A, wherein the second endplate comprises an exhaust vent.

Example 10A: The battery housing of any one of examples 1A to 9A, wherein the elliptical cylinder comprises a plurality of sheets of material laminated together.

Examples 11A: The battery housing of any one of examples 1A to 10A, wherein the elliptical cylinder comprises at least one layer defining a Faraday cage.

Example 12A: The battery housing of any one of examples 1A to 10A, wherein the first sheet end is welded to the second sheet end using at least one of a butt joint, an interlocking finger joint, or a lapped joint.

Example 13A: A method for forming a housing of an aerospace battery, the method comprising: welding at least one sheet of material to form a cylindrical shape; inserting a first end of the cylindrical shape into a first groove formed in a first endplate, wherein the first groove defines a first ellipse; welding the first end of the cylindrical shape to the first endplate; inserting a second end of the cylindrical shape into a second groove formed in a flange, wherein the second groove defines a second ellipse; and welding the second end of the cylindrical shape to the first endplate.

Example 14A: The method of example 13A, wherein the first ellipse and the second ellipse are substantially the same.

Example 15A: The method of example 13A or 14A, further comprising: seating a gasket in a third groove defined in the flange, wherein the third groove is on an opposite side of the flange from the second groove; attaching a second endplate to the flange such that the gasket seals between the flange and the second endplate.

Example 16A: The method of any one of examples 13A to 15A, wherein welding the at least one sheet of material to form the cylindrical shape comprises welding at least one of a butt joint, an interlocking finger joint, or a lapped joint.

Example 17A: The method of any one of examples 13A to 16A, wherein the at lest one sheet of material comprises aluminum, an aluminum alloy, a steel alloy, titanium, or a titanium alloy.

Example 18A: The method of any one of examples 13A to 17A, wherein the at least one sheet of material comprises a plurality of metal sheets laminated together.

Example 19A: The method of any one of examples 13A to 18A, wherein the elliptical cylinder comprises at least one layer defining a Faraday cage.

Example 1B: A battery pack core comprising: a cold plate comprising a plurality of apertures defined between a first major surface and a second major surface of the cold plate; a plurality of battery cells, a single battery cell positioned in each aperture of the plurality of apertures such that a first end of the battery cell projects beyond the first major surface and a second end of the battery cell projects beyond the second major surface; and a plurality of silicone bushings, a silicone bushing surrounding each battery cell of the plurality of battery cells and contacting a wall of the aperture in which the battery cell is positioned.

Example 2B: The battery pack core of example 1B, wherein a first end of each silicone bushing projects beyond the first major surface and a second end of the silicone bushing projects beyond the second major surface.

Example 3B: The battery pack core of example 1B or 2B, wherein the cold plate comprises a metal.

Example 4B: The battery pack core of any one of examples 1B to 3B, wherein the cold plate comprises at least one liquid cooling channel comprising a plurality of parallel channel sections.

Example 5B: The battery pack core of example 4B, wherein the plurality of battery cells are arranged in a plurality of rows, wherein a parallel channel section of the plurality of parallel channel sections is positioned between every other row of battery cells such that two rows of battery cells are positioned between adjacent parallel channel sections of the serpentine liquid cooling channel.

Example 6B: The battery pack core of example 4B or 5B, wherein the at least one liquid cooling channel comprises a serpentine liquid cooling channel with a corresponding turn connecting each pair of adjacent parallel channel sections.

Example 7B: The battery pack core of any one of examples 1B to 5B, wherein the cold plate defines a plurality of thermal break apertures extending from the first major surface to the second major surface, and wherein the plurality of thermal break apertures separate groups of the plurality of battery cells.

Example 8B: The battery pack core of example 7B, wherein at least one thermal break aperture of the plurality of thermal break apertures extends substantially perpendicularly to parallel channel sections adjacent to the at least one thermal break aperture.

Example 9B: The battery pack core of any one of examples 1B to 8B, wherein the cold plate is a structural member of the battery pack core.

Example 10B: A method comprising: assembling a plurality of battery cells, a plurality of silicone bushings, and a cold plate so that a single silicone bushing surrounds a corresponding circumference of each battery cell and a single silicone bushing is in each aperture of a plurality of apertures of the cold plate, wherein a first end of each battery cell projects beyond a first major surface of the cold plate and a second end of each battery cell projects beyond a second major surface of the cold plate, wherein each silicone bushing contacts a wall of the aperture in which the corresponding battery cell is positioned to hold the battery cell in place within the aperture.

Example 11B: The method of example 10B, wherein a first end of each silicone
bushing projects beyond the first major surface and a second end of the silicone bushing projects beyond the second major surface.

Example 12B: The method of example 10B or 11B, wherein the cold plate comprises a metal.

Example 13B: The method of any one of examples 10B to 12B, wherein the cold plate comprises at least one liquid cooling channel comprising a plurality of parallel channel sections.

Example 14B: The method of example 13B, wherein the plurality of battery cells are arranged in a plurality of rows, wherein a parallel channel section of the plurality of parallel channel sections is positioned between every other row of battery cells such that two rows of battery cells are positioned between adjacent parallel channel sections of the serpentine liquid cooling channel.

Example 15B: The method of example 13B or 14B, wherein the at least one liquid cooling channel comprises a serpentine liquid cooling channel with a corresponding turn connecting each pair of adjacent parallel channel sections.

Example 16B: The method of any one of examples 10B to 15B, wherein the cold plate defines a plurality of thermal break apertures extending from the first major surface to the second major surface, and wherein the plurality of thermal break apertures separate groups of the plurality of battery cells.

Example 17B: The method of example 16B, wherein at least one thermal break aperture of the plurality of thermal break apertures extends substantially perpendicularly to parallel channel sections adjacent to the at least one thermal break aperture.

Example 1C: An aerospace battery comprising: a housing; a battery pack core; a ceramic felt surrounding at least part of the battery pack core; and a closed cell foam filling open space between the battery pack core, the ceramic felt, and the housing.

Example 2C: The aerospace battery of example 1C, wherein the closed cell foam comprises a polymer foam.

Example 3C: The aerospace battery of example 2C, wherein the polymer foam comprises a polyurethane foam.

Example 4C: The aerospace battery of example 2C or 3C, wherein the polymer foam is at partially filled with a fire retardant.

Example 5C: The aerospace battery of any one of examples 1C to 4C, wherein the ceramic felt comprises a non-woven felt.

Example 6C: The aerospace battery of any one of examples 1C to 5C, wherein the ceramic felt comprises at least one of an alumina-silicate or a calcium-magnesium oxide.

Example 7C: The aerospace battery of any one of examples 1C to 6C, wherein the closed cell foam and ceramic felt fill at least 75% of the free volume within the housing.

Example 8C: The aerospace battery of any one of examples 1C to 7C, wherein the closed cell foam and ceramic felt fill at least 90% of the free volume within the housing.

Example 9C: The aerospace battery of any one of examples 1C to 6C, further comprising embedded void spaces in the closed cell foam, wherein the embedded void spaces are filled with a non-combustible gas.

Example 10C: The aerospace battery of any one of examples 1C to 9C, wherein the housing comprises an exhaust vent.

Example 11C: The aerospace battery of any one of examples 1C to 10C, wherein the housing comprises: a first endplate; a flange; and an elliptical cylinder extending from a first cylinder end to a second cylinder end, wherein the first cylinder end of the elliptical cylinder is welded to the first endplate, wherein the second cylinder end of the elliptical cylinder is welded to the flange, wherein the elliptical cylinder is formed from at least one sheet of material comprising a first sheet end and a second sheet end, and wherein the first sheet end is welded to the second sheet end at a weld location that runs from the first cylinder end to the second cylinder end at a perimeter location that is calculated to experience a reduced stress during pressurization of the housing.

Example 12C: The aerospace battery of example 11C, wherein the elliptical cylinder comprises aluminum, an aluminum alloy, a steel alloy, titanium, or a titanium alloy.

Example 13C: The aerospace battery of example 11C or 12C, wherein the flange defines an aperture configured to provide access to an interior of the elliptical cylinder.

Example 14C: The aerospace battery of example 13C, wherein the flange defines a channel, and wherein the housing further comprises a gasket in the channel.

Example 15C: The aerospace battery of example 14C, wherein the housing further comprises a second endplate configured to seat against the flange, be attached to the flange, and seal against the gasket.

Example 16C: The aerospace battery of any one of examples 11C to 15C, wherein the flange further comprises groove in which the second cylinder end is inserted.

Example 17C: The aerospace battery of any one of examples 11C to 16C, wherein the first endplate further comprises groove in which the first cylinder end is inserted.

Example 18C: The aerospace battery of any one of examples 15C to 17C, wherein the second endplate further comprises an electrical connector.

Example 19C: The aerospace battery of any one of examples 15C to 18C, wherein the second endplate comprises an exhaust vent.

Example 20C: The aerospace battery of any one of examples 11C to 19C, wherein the elliptical cylinder comprises a plurality of metal sheets laminated together.

Example 21C: The aerospace battery of any one of examples 11C to 20C, wherein comprises at least one layer defining a Faraday cage.

Example 22C: The aerospace battery of any one of examples 11C to 21C, wherein the first sheet end is welded to the second sheet end using at least one of a butt joint, an interlocking finger joint, or a lapped joint.

Example 23C: The aerospace battery of any one of examples 1C to 22C, wherein the battery pack core comprises: a cold plate comprising a plurality of apertures defined between a first major surface and a second major surface of the cold plate; a plurality of battery cells, a single battery cell positioned in each aperture of the plurality of apertures such that a first end of the battery cell projects beyond the first major surface and a second end of the battery cell projects beyond the second major surface; and a plurality of silicone bushings, a silicone bushing surrounding each battery cell of the plurality of battery cells and contacting a wall of the aperture in which the battery cell is positioned.

Example 24C: The aerospace battery of example 23, wherein a first end of each silicone bushing projects beyond the first major surface and a second end of the silicone bushing projects beyond the second major surface.

Example 25C: The aerospace battery of example 23 or 24, wherein the cold plate comprises a metal.

Example 26C: The aerospace battery of any one of examples 23C to 25C, wherein the cold plate comprises at least one liquid cooling channel comprising a plurality of parallel channel sections.

Example 27C: The aerospace battery of example 26C, wherein the plurality of battery cells are arranged in a plurality of rows, wherein a parallel channel section of the plurality of parallel channel sections is positioned between every other row of battery cells such that two rows of battery cells are positioned between adjacent parallel channel sections of the serpentine liquid cooling channel.

Example 28C: The aerospace battery of example 26C or 27C, wherein the at least one liquid cooling channel comprises a serpentine liquid cooling channel with a corresponding turn connecting each pair of adjacent parallel channel sections.

Example 29C: The aerospace battery of any one of examples 23C to 28C, wherein the cold plate defines a plurality of thermal break apertures extending from the first major surface to the second major surface, and wherein the plurality of thermal break apertures separate groups of the plurality of battery cells.

Example 30C: The aerospace battery of example 29C, wherein at least one thermal break aperture of the plurality of thermal break apertures extends substantially perpendicularly to parallel channel sections adjacent to the at least one thermal break aperture.

Example 31C: A method comprising: inserting a form within a housing of an aerospace battery, wherein the form corresponds to a shape of a battery pack core to be housed within the housing; reactive molding a closed cell foam within the housing around the form, wherein the closed cell foam fills substantially all the space between the housing and the form; removing the form to define a cavity in the closed cell foam; and inserting a battery pack core in the cavity.

Example 32C: The method of example 31C, further comprising positioning a ceramic felt around the form prior to reactive molding the closed cell foam.

Example 33C: The method of example 31C, further comprising positioning a ceramic felt contacting an inner surface of the housing prior to reactive molding the closed cell foam.

Example 34C: The method of example 31C, further comprising placing at least one bag or pouch between the form and the housing prior to reactive molding the closed cell foam.

Various examples have been described. These and other examples are within the scope of the following claims.

What is claimed is:

1. A battery pack core comprising:
 a cold plate comprising a plurality of apertures defined between a first major surface and a second major surface of the cold plate, wherein the cold plate comprises at least one liquid cooling channel comprising a plurality of parallel channel sections;
 a plurality of battery cells, a single battery cell positioned in each aperture of the plurality of apertures such that a first end of the battery cell projects beyond the first major surface and a second end of the battery cell projects beyond the second major surface; and
 a plurality of silicone bushings, a respective silicone bushing of the plurality of silicone bushings surrounding each respective battery cell of the plurality of battery cells and contacting a respective wall of the respective aperture in which the respective battery cell is positioned, wherein a first end of each of the plurality of silicone bushings projects beyond the first major surface and a second end of each of the plurality of silicone bushings projects beyond the second major surface, and wherein respective first ends of each of the plurality of battery cells project beyond respective first ends of each of the plurality of silicone bushings.

2. The battery pack core of claim 1, wherein the cold plate comprises a metal.

3. The battery pack core of claim 1, wherein the plurality of battery cells are arranged in a plurality of rows, wherein a parallel channel section of the plurality of parallel channel sections is positioned between every other row of battery cells such that two rows of battery cells are positioned between adjacent parallel channel sections of the plurality of parallel channel sections.

4. The battery pack core of claim 1, wherein the at least one liquid cooling channel comprises a serpentine liquid cooling channel with a corresponding turn connecting each pair of adjacent parallel channel sections.

5. The battery pack core of claim 1, wherein the cold plate defines a plurality of thermal break apertures extending from the first major surface to the second major surface, and wherein the plurality of thermal break apertures separate groups of the plurality of battery cells.

6. The battery pack core of claim 5, wherein at least one thermal break aperture of the plurality of thermal break apertures extends substantially perpendicularly to parallel channel sections adjacent to the at least one thermal break aperture.

7. The battery pack core of claim 1, wherein the cold plate is a structural member of the battery pack core.

8. The battery pack core of claim 1, wherein the at least one liquid cooling channel comprises at least one serpentine liquid cooling channel connecting a pair of parallel channel sections of the plurality of parallel channel sections.

9. A method comprising:
 assembling a plurality of battery cells, a plurality of silicone bushings, and a cold plate so that a single silicone bushing surrounds a corresponding circumference of each battery cell and a single silicone bushing of the plurality of silicone bushings is in each aperture of a plurality of apertures of the cold plate, wherein a first end of each battery cell projects beyond a first major surface of the cold plate and a second end of each battery cell projects beyond a second major surface of the cold plate, wherein each silicone bushing of the plurality of silicone bushings contacts a wall of the aperture in which the corresponding battery cell is positioned to hold the battery cell in place within the aperture, wherein a first end of each of the plurality of silicone bushings projects beyond the first major surface and a second end of each of the plurality of silicone bushings projects beyond the second major surface, wherein the cold plate comprises at least one liquid cooling channel comprising a plurality of parallel channel sections, and wherein respective first ends of each of the plurality of battery cells project beyond respective first ends of each of the plurality of silicone bushings.

10. The method of claim 9, wherein the cold plate comprises a metal.

11. The method of claim 9, wherein the plurality of battery cells are arranged in a plurality of rows, wherein a parallel channel section of the plurality of parallel channel sections is positioned between every other row of battery cells such that two rows of battery cells are positioned between adjacent parallel channel sections of the plurality of parallel channel sections.

12. The method of claim 9, wherein the at least one liquid cooling channel comprises a serpentine liquid cooling channel with a corresponding turn connecting each pair of adjacent parallel channel sections.

13. The method of claim 9, wherein the cold plate defines a plurality of thermal break apertures extending from the first major surface to the second major surface, and wherein the plurality of thermal break apertures separate groups of the plurality of battery cells.

14. The method of claim 13, wherein at least one thermal break aperture of the plurality of thermal break apertures extends substantially perpendicularly to parallel channel sections adjacent to the at least one thermal break aperture.

15. An aircraft comprising:
 the battery pack core of claim 1; and
 one or both of:
 an electric propulsor configured to propel the aircraft using electrical energy sourced from the battery pack core; and
 a gas-turbine engine configured to start using electrical energy sourced from the battery pack core.

16. An aircraft comprising:
 a battery pack core comprising:
 a cold plate comprising a plurality of apertures defined between a first major surface and a second major surface of the cold plate, wherein the cold plate comprises at least one liquid cooling channel comprising a plurality of parallel channel sections;
 a plurality of battery cells, a single battery cell positioned in each aperture of the plurality of apertures such that a first end of the battery cell projects beyond the first major surface and a second end of the battery cell projects beyond the second major surface; and
 a plurality of silicone bushings, a respective silicone bushing of the plurality of silicone bushings surrounding each respective battery cell of the plurality of battery cells and contacting a respective wall of the respective aperture in which the respective battery cell is positioned, wherein a first end of each of the plurality of silicone bushings projects beyond the first major surface and a second end of each of the plurality of silicone bushings projects beyond the second major surface, wherein respective first ends of each of the plurality of battery cells project beyond respective first ends of each of the plurality of silicone bushings, wherein the plurality of battery cells are arranged in a plurality of rows, wherein a parallel channel section of the plurality of parallel channel sections is positioned between every other row of battery cells such that two rows of battery cells are positioned between adjacent parallel channel sections of the plurality of parallel channel sections, and wherein a wall thickness of each of the plurality of silicone bushings is between 1 mm and 5 mm; and an electric propulsor configured to propel the aircraft using electrical energy sourced from the battery pack core.

\* \* \* \* \*